United States Patent
Pan et al.

(10) Patent No.: US 12,557,161 B2
(45) Date of Patent: Feb. 17, 2026

(54) METHOD AND APPARATUS FOR SECONDARY NODE OR CELL GROUP ADDITION IN A COMMUNICATION SYSTEM

(71) Applicant: Samsung Electronics Co., Ltd., Suwon-si (KR)

(72) Inventors: Yu Pan, Beijing (CN); Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 18/158,869

(22) Filed: Jan. 24, 2023

(65) Prior Publication Data

US 2023/0239947 A1    Jul. 27, 2023

(30) Foreign Application Priority Data

Jan. 26, 2022  (CN) .................... 202210096193.X
Dec. 16, 2022  (CN) .................... 202211626715.9

(51) Int. Cl.
  *H04W 76/15*    (2018.01)
  *H04L 5/00*     (2006.01)

(52) U.S. Cl.
  CPC ........... *H04W 76/15* (2018.02); *H04L 5/0035* (2013.01)

(58) Field of Classification Search
  CPC ............. H04W 76/15; H04W 36/0069; H04W 36/008355; H04W 36/00837; H04W 36/005357; H04W 92/20; H04W 8/24; H04W 88/085; H04L 5/0035; H04L 5/0055
  See application file for complete search history.

(56) References Cited

U.S. PATENT DOCUMENTS

| | | | |
|---|---|---|---|
| 2020/0154321 | A1 | 5/2020 | Kang et al. |
| 2020/0267631 | A1 | 8/2020 | Yilmaz et al. |
| 2020/0389823 | A1 | 12/2020 | Xu et al. |
| 2020/0396661 | A1 | 12/2020 | Wu |

FOREIGN PATENT DOCUMENTS

| | | |
|---|---|---|
| WO | 2020167170 A1 | 8/2020 |
| WO | 2021066515 A1 | 4/2021 |

OTHER PUBLICATIONS

Supplementary European Search Report dated Oct. 4, 2024, in connection with European Application No. 23747252.7, 12 pages.
3GPP TS 37.340 V1 6.8.0 (Dec. 2021), Technical Specification, 3rd Generation Partnership Project; Technical Specification Group Radio Access Network; Evolved Universal Terrestrial Radio Access (E-UTRA) and NR; Multi-connectivity; Stage 2 (Release 16), Dec. 2021, 89 pages.
International Search Report and Written Opinion of the International Searching Authority dated Apr. 7, 2023, in connection with International Application No. PCT/KR2023/000923, 8 pages.

*Primary Examiner* — Peter Chen

(57) ABSTRACT

The present application relates to a method for adding a node in a mobile communication system. A method performed by a first node in a mobile communication system is provided. User equipment (UE) is connected to the first node and a second node. The method comprises: sending a message used for requesting or requiring an addition of a third node; and receiving an acknowledge message in response to the message.

20 Claims, 19 Drawing Sheets

METHOD AND APPARATUS FOR SECONDARY NODE OR CELL GROUP ADDITION IN A COMMUNICATION SYSTEM

CROSS-REFERENCE TO RELATED APPLICATIONS

This application is based on and claims priority under 35 U.S.C. § 119(a) to Chinese Patent Application Nos. 202210096193.X and 202211626715.9, which were filed in the China National Intellectual Property Administration on and Jan. 26, 2022, and Dec. 16, 2022, respectively, the entire disclosure of each which is incorporated herein by reference.

BACKGROUND

1. Field

The present application relates to wireless communication technologies, and specifically to a device and method for exchanging information between a master node and a secondary node, and a device and method for interacting user-related context between central unit and a distributed unit in nodes.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (Bandwidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The present disclosure provides a method and device for adding new nodes in a scenario of multi-connectivity. Transmission requirements of user services are satisfied on the basis of implementing load balance between nodes. By adding new connected nodes, signaling overheads and service interruption caused by node change due to the movement of UE are reduced.

According to an aspect of the present disclosure, a method performed by a first node in a mobile communication system is provided, user equipment (UE) being connected to the first node and a second node, the method comprising: sending a message used for requesting or requiring the addition of a third node; and receiving an acknowledge message in response to the message.

Alternatively, the method further comprises: sending, by the first node, a first message to the second node, wherein the first message is used for requesting the information of the second node from the second node; and receiving a second message in response to the first message from the second node, wherein the second message comprises at least one of the following: load status of the second node, information of a candidate node list, and multi-connectivity support capability information of the second node.

Alternatively, the method further comprises: receiving, by the first node, a third message from the second node, wherein the third message is used for requiring the addition of the third node, wherein the third message comprises at least one of the following: an indication of requiring the addition of the third node, information of a candidate node list or a candidate cell list, and information of establishing a signaling radio bearer SRB3 by the second node.

Alternatively, the method further comprises: sending, by the first node, a fourth message to the third node for requesting the addition of the third node, wherein the fourth message comprises the bearer indication of the resource scheduling information for the third node.

Alternatively, the method further comprises: sending, by the first node, a fifth message to the second node for indicating that the addition of the third node is completed, wherein the fifth message comprises at least one of the following: indication for the completion of the third node addition, identity information of the third node, identity information of a third cell group, and bearer indication of the resource scheduling information.

Alternatively, the method further comprises: sending, by the first node, a sixth message to the second node, wherein the sixth message comprises at least one of the following: bearer indication of the resource scheduling information for the third node, and a user identity that has been assigned by the second node to the UE, an indication of the third node addition, and at least one of the information of a candidate cell list and a measurement result; and receiving a seventh message from the second node, wherein the seventh message comprises at least one of the following: an indication of the completion of the third node addition or of a third cell group addition, an identity information of the third node, an identity information of the third cell group, a configuration information of the third node, and a configuration information of the third cell group.

Alternatively, the method further comprises: receiving, by the first node, an eighth message sent by the second node for requiring the addition of the third node, wherein the eighth message comprises at least one of the following: an indication of requiring the addition of the third node, an information of a candidate node list or a candidate cell list, and information of establishing a signaling radio bearer SRB3 by the second node; sending, to the second node, a ninth message in response to the eighth message, wherein the ninth message comprises at least one of the following: an indication of the third node addition, an indication of the execution node, the information of the candidate node list or the candidate cell list, an involvement indication of the first node, and the bearer indication of the resource scheduling information for the third node.

Alternatively, the method further comprises: receiving, by the first node, a twelfth message from the second node according to the involvement indication of the first node, wherein the twelfth message comprises at least one of the following: an indication of the completion of the third node addition, an identity information of the third node, an identity information of a third cell group, configuration information of the third node, and a configuration information of the third cell group.

Alternatively, the method further comprises: sending, by the first node, a thirteenth message to the user equipment according to the involvement indication of the first node, wherein the thirteenth message comprises at least one of the following: an identity information of a third cell group, and the configuration information of the third cell group; and receiving a fourteenth message sent by the second node, wherein the fourteenth message comprises at least one of the following: an indication of completion of the third node addition, an identity information of the third node, an identity information of the third cell group, a configuration information of the third node.

According to an aspect of the present disclosure, a method performed by a second node in a mobile communication system is provided, user equipment (UE) being connected to the first node and a second node, the method comprising: sending, by the second node, a message used for requesting or requiring the addition of a third node; and receiving an acknowledge message in response to the message.

Alternatively, the method further comprises: receiving, by the second node, a first message from the first node, wherein the first message is used for requesting information of the second node from the second node; and sending a second message in response to the first message to the first node, wherein the second message comprises at least one of the following: load status of the second node, an information of a candidate node list, and a multi-connectivity support capability information of the second node.

Alternatively, the method further comprises: sending, by the second node, a third message to the first node, wherein the third message is used for requiring the addition of the third node, wherein the third message comprises at least one of the following: an indication of requiring the addition of the third node, an information of a candidate node list or a candidate cell list, and an information of establishing a signaling radio bearer SRB3 by the second node.

Alternatively, the method further comprises: receiving, by the second node, a fifth message from the first node for indicating that the addition of the third node is completed, wherein the fifth message comprises at least one of the following: an indication for completion of the third node addition, an identity information of the third node, an identity information of a third cell group, and a bearer indication of the resource scheduling information.

Alternatively, the method further comprises: receiving, by the second node, a sixth message from the first node, wherein the sixth message comprises at least one of the following: a bearer indication of the resource scheduling information for the third node, and a user identity that has been assigned by the second node to the UE, an indication of the third node addition, and at least one of the information about a candidate cell list and a measurement result; and sending a fifteenth message to a fourth node, wherein the fifteenth message comprises a bearer indication of the resource scheduling information for the third node; and sending a seventh message to the first node, wherein the seventh message comprises at least one of the following: an indication of the completion of the third node addition or of a third cell group addition, an identity information of the third node, an identity information of the third cell group, a configuration information of the third node, and a configuration information of the third cell group.

Alternatively, the method further comprises: sending, by the second node, an eighth message to the first node for requiring the addition of the third node, wherein the eighth message comprises at least one of the following: an indication of requiring the addition of the third node, an information of a candidate node list or a candidate cell list, and information of establishing a signaling radio bearer SRB3 by the second node; and receiving a ninth message sent by the first node in response to the eighth message, wherein the ninth message comprises at least one of the following: indication of the third node addition, an indication of the execution node, the information of the candidate node list or the candidate cell list, an involvement indication of the second node, and a bearer indication of the resource scheduling information for the third node.

Alternatively, the method further comprises: sending, by the second node, a tenth message to the third node, for requesting the addition of the third node, wherein the tenth message comprises the bearer indication of the resource scheduling information for the third node; and sending, an eleventh message to a fourth node, wherein the eleventh message comprises the bearer indication of resource scheduling information for the third node.

Alternatively, the method further comprises: sending, by the second node, a twelfth message to the first node, wherein the twelfth message comprises at least one of the following: an indication of the completion of the third node addition, an identity information of the third node, an identity information of a third cell group, a configuration information of the third node, and a configuration information of the third cell group; and sending a sixteenth message to the user equipment, wherein the sixteenth message comprises at least one of the following: an identity information of a third cell group, and a configuration information of the third cell group.

Alternatively, the method further comprises: sending, by the second node, a fourteenth message to the first node according to the involvement indication of the first node, wherein the fourteenth message comprises at least one of the following: an indication of the completion of the third node addition, an identity information of the third node, an identity information of a third cell group, configuration information of the third node.

According to an aspect of the present disclosure, a method performed by a third node in a mobile communication system is provided, user equipment (UE) being connected to a first node and a second node, the method comprising: receiving a request message for addition from one of the first node or the second node; and sending an acknowledge message in response to the request message to the corresponding one of the first node or the second node.

Alternatively, the message comprises bearer indication of resource scheduling information for the third node.

Alternatively, the bearer indication comprises an indication of sending the resource scheduling information by the third node, and the third node configuring a physical downlink control channel PDCCH for the user equipment.

Alternatively, the bearer indication comprises the indication of the resource scheduling information sent by a node except the third node, and the third node sending the resource scheduling information to the node for forwarding the received information to the user equipment.

According to an aspect of the present disclosure, a first node in a wireless communication system is provided, comprising: a transceiver; and a processor, configured to be coupled to the transceiver and perform the foregoing method.

According to an aspect of the present disclosure, a second node in a wireless communication system is provided, comprising: a transceiver; and a processor, configured to be coupled to the transceiver and perform the foregoing method.

According to an aspect of the present disclosure, a third node in a wireless communication system is provided, comprising: a transceiver; and a processor, configured to be coupled to the transceiver and perform the foregoing method.

In the foregoing scenario supporting multi-connectivity, the method for adding nodes comprises triggering and decision-making of addition of a new node, selection of an execution node, and transmission of corresponding configuration information. By collaboration between the nodes to select the appropriate new node and the execution node, load balance is implemented between the nodes, user requirements are satisfied, and signaling overheads and service interruption caused by nodes change due to user mobility can be effectively avoided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

The foregoing and additional aspects and advantages of the present application will become more apparent and easily understood by the following description in conjunction with the accompanying drawings, where.

DETAILED DESCRIPTION

Figure 1:
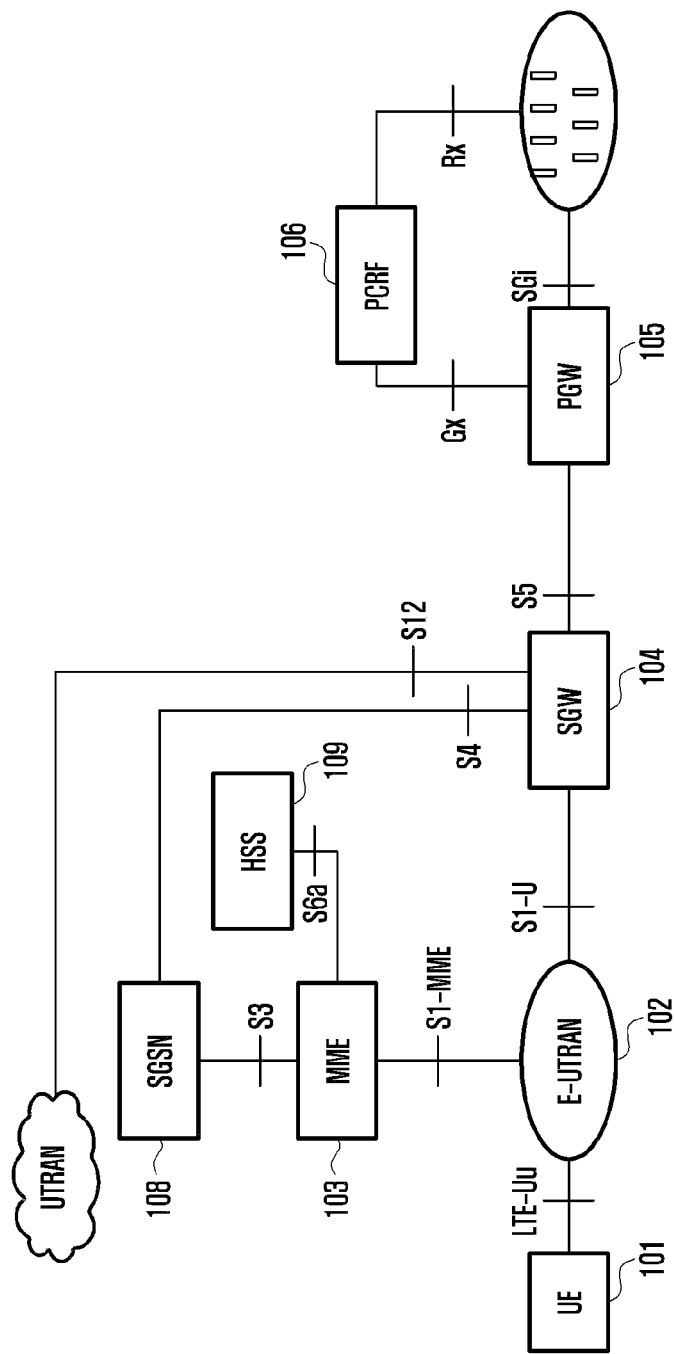
FIG. 1 illustrates a diagram of an exemplary system architecture of system architecture evolution (SAE) according to an embodiment of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

FIGS. 1 to 13 discussed below and various embodiments for describing the principles of the present disclosure in this patent document are only for illustration and should not be interpreted as limiting the scope of the present disclosure in any way. Those skilled in the art will understand that the principles of the present disclosure can be implemented in any suitably arranged system or device.

FIG. 1 illustrates an exemplary system architecture 100 of system architecture evolution (SAE). User equipment (UE) 101 is a terminal device for receiving data. An evolved universal terrestrial radio access network (E-UTRAN) 102 is a radio access network, which includes a macro base station (eNodeB/NodeB) that provides UE with interfaces to access the radio network. A mobility management entity (MME) 103 is responsible for managing mobility context, session context and security information of the UE. A serving gateway (SGW) 104 mainly provides functions of user plane, and the MME 103 and the SGW 104 may be in the same physical entity. A packet data network gateway (PGW) 105 is responsible for functions of charging, lawful interception, etc., and may be in the same physical entity with the SGW 104. A policy and charging rules function entity (PCRF) 106 provides quality of service (QoS) policies and charging criteria. A general packet radio service support node (SGSN) 108 is a network node device that provides routing for data transmission in a universal mobile telecommunications system (UMTS). A home subscriber server (HSS) 109 is a home subsystem of the UE, and is responsible for protecting user information including a current location of the user equipment, an address of a serving node, user security information, and packet data context of the user equipment, etc.

Figure 2:
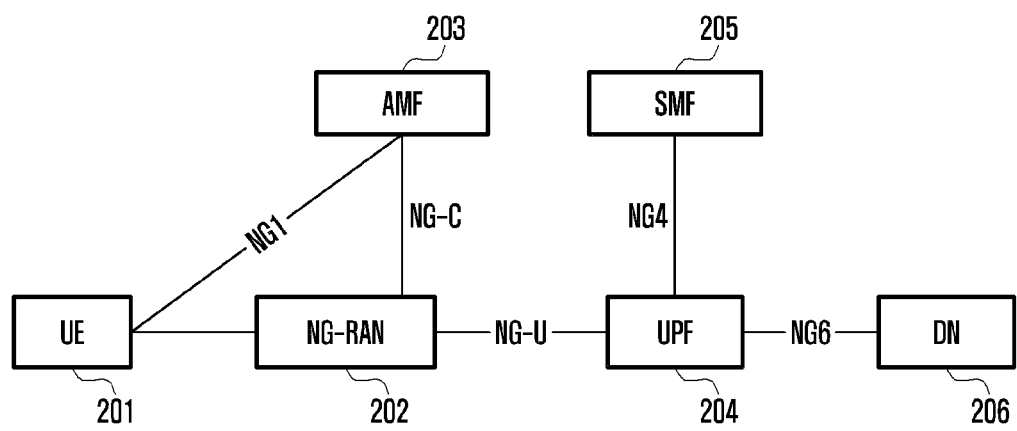
FIG. 2 illustrates a diagram of an exemplary system architecture according to an embodiment of the present disclosure.

FIG. 2 illustrates an exemplary system architecture 200 according to various embodiments of the present disclosure. Other embodiments of the system architecture 200 can be used without departing from the scope of the present disclosure.

User equipment (UE) 201 is a terminal device for receiving data. A next generation radio access network (NG-RAN) 202 is a radio access network, which includes a base station (a gNB (generation NodeB) or an eNB (evolved NodeB) connected to 5G core network 5GC, and the eNB connected to the 5GC is also called ng-gNB (next generation eNodeB)) that provides a UE with interfaces to access the radio network. An access control and mobility management function entity (AMF) 203 is responsible for managing mobility context and security information of the UE. A user plane function entity (UPF) 204 mainly provides functions of user plane. A session management function entity SMF 205 is responsible for session management. A data network (DN) 206 includes, for example, services of operators, access of Internet and service of third parties, and the like.

Exemplary embodiments of the present disclosure are further described below with reference to the accompanying drawings.

The text and drawings are provided as examples only to help understand the present disclosure. They should not be interpreted as limiting the scope of the present disclosure in any way. Although certain embodiments and examples have been provided, based on the present disclosure herein, it will be apparent to those skilled in the art that changes may be made to the illustrated embodiments and examples without departing from the scope of the present disclosure.

Detailed description of steps unrelated to the present disclosure is omitted in the present application. In the following embodiments, an example of a 5G system, a central unit CU of an access network, and a distributed unit DU is used for description. The method is also used in corresponding entities in another system.

In the present application, a secondary node SN may be a complete base station or may be a base station including a central unit and a distributed unit or may be a base station including a central unit-control plane (CU-CP), a central unit-user plane (CU-UP), and a distributed unit.

In the present application, the names of messages are only examples, and other names may be used for the messages. The serial number of a message does not represent the order of executing the message but instead only represents the name of the message.

In NR access network release Release 15, dual connectivity is introduced to improve network performance and the service traffic for a single user, and the performance of the technology keeps being improved in the research of R16 and R17.

In dual connectivity, a UE is connected to two nodes. One node is used as a master node (MN), and the other node is used as a secondary node secondary node (SN). A group of cells of MN serving the UE are referred to as a master cell group master cell group (MSG), and a group of cells of SN serving the UE are referred to as a secondary cell group (SCG, Secondary Cell Group). An SN ID is used as an identity of the SN, and an SCG ID is used as a cell group identity (CG ID) of the SCG.

In a central unit/distributed unit (CU/DU) separation node architecture, if the UE is connected to different distributed units (DUs) in the same node, this case may also be considered as dual connectivity. One of the DUs configures an MCG for the UE, and the other DU configures an SCG for the UE.

In dual connectivity, SN addition is completed by triggering and executing by an MN according to a measurement result from a UE and the load status.

For transmission requirements imposed by service types of users, the load of the node increases inevitably, and more nodes may be required to share the load. In addition, along with the application of the FR2 frequency, the coverage of an SN decreases. Therefore, within the same coverage area, more nodes (or connections) may be required, and the movement of the UE may cause SN change. Therefore, by increasing the amount of secondary node (SN) based on the dual connectivity or increasing the amount of SCGs in a CU/DU separation architecture and combining a flexible scheduling policy, relatively higher service transmission requirements of users can be satisfied, and service interruption and signaling overheads caused by SN change can be reduced.

Figure 3A:
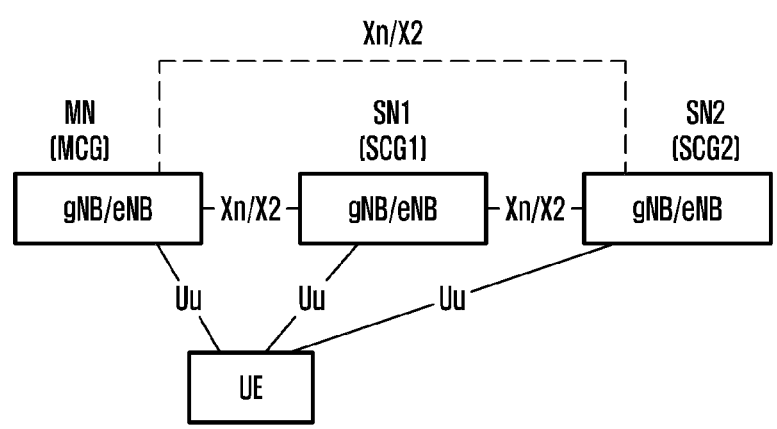
FIG. 3a illustrates a diagram of a schematic architecture of a multi-connectivity system according to an embodiment of the present disclosure.
Figure 3B:
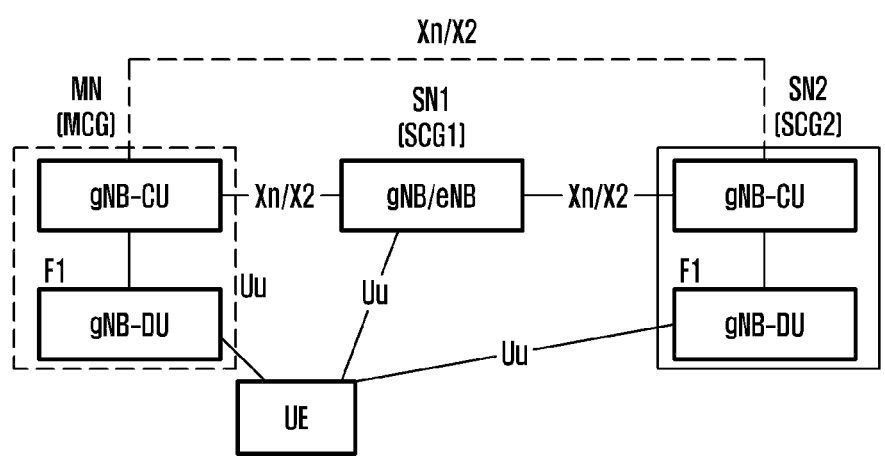
FIG. 3b illustrates a diagram of a schematic architecture of a multi-connectivity system according to an embodiment of the present disclosure.
Figure 3C:
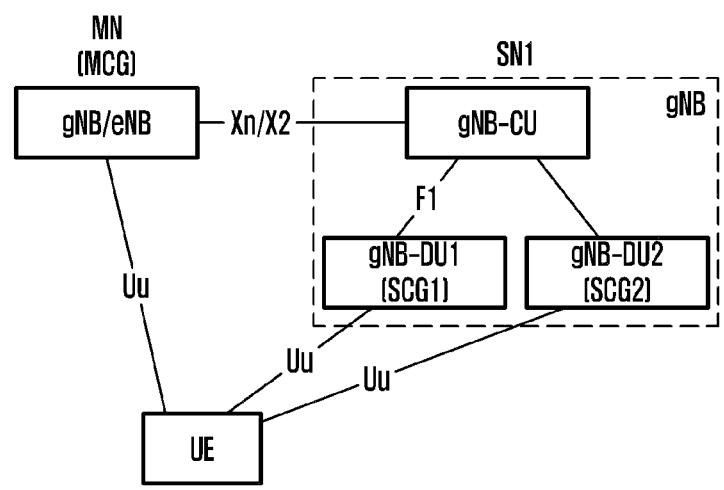
FIG. 3c illustrates a diagram of a schematic architecture of a multi-connectivity system according to an embodiment of the present disclosure.

FIGS. 3a, 3b, and 3c show diagrams of a schematic architecture of a multi-connectivity system. An MN and an SN1 are two nodes in dual connectivity, and the MN and the SN1 may be gNBs or eNBs. The MN and the SN1 may be independent base stations or may be base stations in the CU/DU separation architecture (as shown in FIG. 3b). An added connection may be a new node SN2 (as shown in FIG. 3a), the SN2 may be an independent base station or may be a base station in the CU/DU separation architecture (as shown in FIG. 3b). The added node may be alternatively a DU2 in the SN1 (as shown in FIG. 3c). In the scenario, from the perspective of the MN, no new node is added, but instead only a new cell group (an SCG2) is added. Subsequently, for convenience of description, in the description of a procedure between nodes, SN2 addition is used to represent that a new node is added or a new cell group SCG2 is added in the same node. From the perspective of UE, regardless of whether the added node is SN2 or the DU2 in the SN1, a cell group SCG2 is added for the UE. An SN2 ID is used as an identity of the new node SN2, and an SCG2 ID is used as an identity of the new cell group.

In the existing dual connectivity technology, the management of SN addition is triggered and executed by an MN, then in a multi-connectivity scenario, in an addition procedure of a third node SN2 or SCG2, major problems include: the triggering and decision-making of SN2/SCG2 addition and selection of an execution node for SN2/SCG2 addition; a manner of selecting an execution node (which may be the MN or the SN1) by the MN after an SN2/SCG2 addition request is triggered; and if the SN1 is used as the execution node, MN needs to indicate SN1 how to send the configuration information of the SCG2 to a UE.

Therefore, SN2 addition procedure mainly includes two steps.

Step 1: A preparation process for a new node addition, the MN needs to confirm whether the UE has a capability of simultaneously receiving data from or sending data to multiple nodes/cell groups (CGs) and whether the SN1 has a capability of supporting multi-connectivity.

Figure 4:
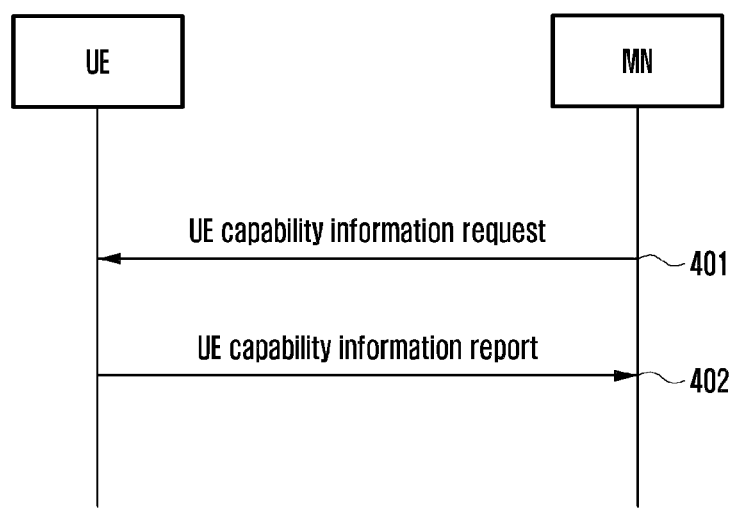
FIG. 4 illustrates a schematic diagram of a transmission process of user equipment UE capability information according to an embodiment of the present disclosure.

FIG. 4 illustrates a schematic diagram of a transmission process of UE capability information.

As shown in FIG. 4, in a transmission process of a UE capability, through step 401, an MN sends a UE capability information request message to request from a UE whether the UE has a multi-connectivity capability. In addition, through step 402, the UE sends a UE capability information report message to the MN to inform whether the UE has the multi-connectivity capability.

Figure 5:
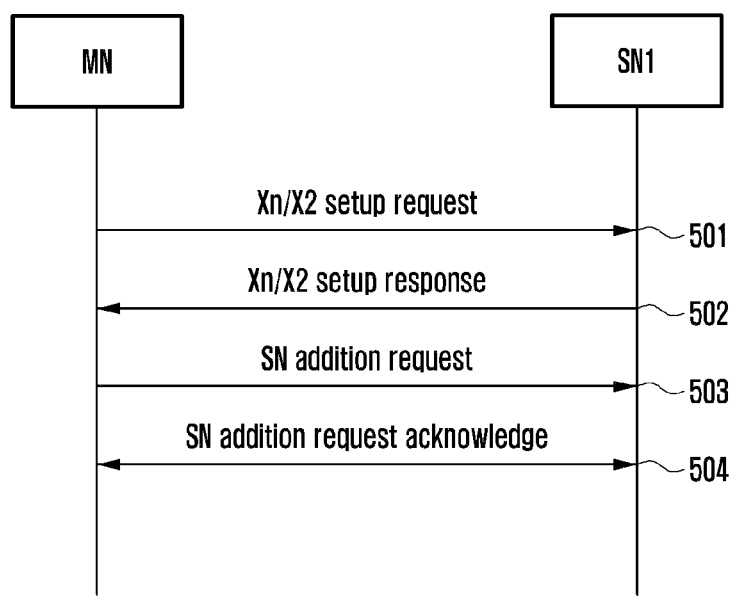
FIG. 5 illustrates a schematic diagram of transmission of multi-connectivity capability information of a second node SN (a secondary node) according to an embodiment of the present disclosure.

FIG. 5 illustrates a schematic diagram of transmission of SN multi-connectivity capability information.

As shown in FIG. 5, through an Xn/X2 setup procedure or an SN1 addition procedure, through step 502 or step 504, an SN1 may respectively use an Xn/X2 setup response message or an SN addition request acknowledge message to inform MN whether the SN1 has a multi-connectivity capability, and the frequency or coverage information of a serving cell of the SN1, and the like. In addition, through the Xn/X2 setup procedure or the SN1 addition procedure, through step 501 or step 503, the MN may respectively use an Xn/X2 setup request message or an SN addition request message to request the SN1 whether the SN1 has the multi-connectivity capability, and the frequency or coverage information of the serving cell of the SN1, and the like.

Step 2: An addition procedure of a new node. It relates to the processes including the triggering and decision-making of a new node SN2 addition, an execution node selection, and performing the addition procedure of a new node based on the selected execution node.

An addition request of the new node SN2 may be triggered by the MN or the SN1, and finally the MN decides whether to perform the addition procedure of a new node SN2. If deciding to add an SN2, the MN further needs to determine whether the execution node is the MN or the SN1 and by which node to send the uplink and downlink resources scheduling information of the SCG2 configured by the SN2 to the UE, to facilitate the coordination of uplink transmission scheduling of the UE between the nodes, prevent the uplink transmission capability of the UE from being exceeded due to being simultaneously scheduled by multiple nodes, and help to reduce blind detection overheads of the UE for PDCCH, thereby reducing UE power consumption.

Based on load statuses reported by the MN and the SN1, a movement speed of the UE, a frequency and coverage of the SN1, and other factors, the MN decides whether it is necessary to add an SN2. According to information obtained from the SN1, the MN decides to select MN itself or SN1 as the execution node to perform SN2 addition. When deciding the SN1 as the execution node, the MN decides whether to be involved in the procedure and notifies the decision to the SN1.

In the addition procedure of a new node, if the MN is the execution node, the MN exchanges information with the SN2 to perform an addition procedure of the SN2, and sends information about an SCG2 configured by the SN2 to the UE. If the SN1 is the execution node, the SN1 exchanges information with the SN2 to perform an addition procedure of the SN2, and directly sends information about an SCG2 configured by the SN2 to the UE or sends the information to the UE through the manner of being forwarded by the MN.

Figure 6:
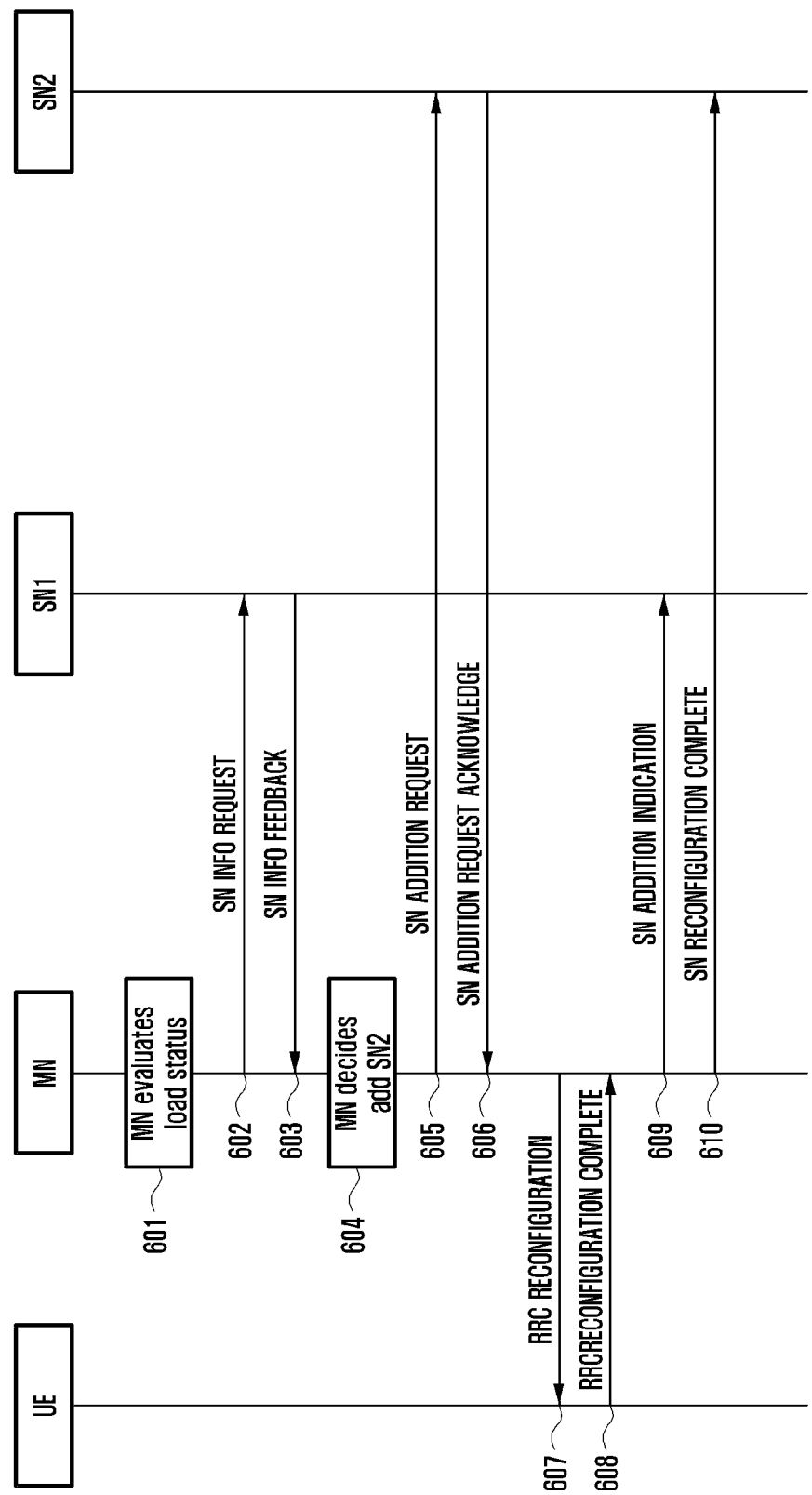
FIG. 6 illustrates a schematic diagram of a method for adding a new node according to an embodiment of the present disclosure.

FIG. 6 illustrates a schematic diagram of a method for adding a new node according to an embodiment of the present disclosure. An MN triggers SN2 addition and the MN is the execution node to perform SN2 addition. Steps included in the method are shown in FIG. 6. Wherein:

Step 601: The MN evaluates the load status. By the evaluation of the load status, the MN determine that the MN is overloaded or cannot bear a new service requirement of UE, and may consider triggering SN2 addition to alleviate the load of the MN; and Step 602: The MN sends an SN information request to an SN1. Through step 603: The SN1 sends an SN information feedback to the MN, including at least one of the following information:

the load status of the SN1;
a candidate node list (a list of SNs having an interface with the SN1); and
a multi-connectivity capability information (including bearing the scheduling information of other nodes) of the SN1.

Based on the foregoing information, the MN evaluates whether it is necessary to add an SN2 and selects an appropriate node SN2 for addition.

Step 604: The MN decides to add an SN2.

When the MN decides, according to the obtained information of the SN1, it is necessary to add a node SN2. According to a measurement result provided by the UE, the MN preferentially selects, from the list of SNs having an interface with the SN1 obtained in step 603, an SN having an interface with both the MN and the SN1 as a target SN2, to facilitate subsequent message and data interaction directly between the nodes. The MN may alternatively determine whether it is necessary to add a node SN2, thereby reducing signaling overheads caused by service interruption and node change due to the movement of the UE, according to the mobility of the UE and the frequency or coverage information of a serving cell of the SN1, and the like, and when SN2 addition is triggered for this reason, steps 601 to 603 may be omitted. The MN further needs to determine, according to a UE capability, which node, among the MN, the SN1, and the SN2, sends the uplink and downlink resources scheduling information of an SCG2 configured by the SN2 to the UE.

Step 605: The MN sends an SN addition request message to the target SN2, where the SN addition request message includes the bearer indication of the resource scheduling information of the SCG2 configured by the SN2 for indicating which node, among the MN, the SN1, and the SN2, sends the uplink and downlink radio resources scheduling information of cells of the SCG2 to the UE, to facilitate the coordination of the uplink transmission scheduling of the UE between the nodes, prevent the uplink transmission capability of the UE from being exceeded due to being simultaneously scheduled by multiple nodes, and help to reduce blind detection overheads of the UE for PDCCH, thereby reducing the UE power consumption. If the resource scheduling information sent by the SN2, the SN2 needs to configure a physical downlink control channel (PDCCH) for the SCG2, or otherwise the SN2 does not need to configure a PDCCH. If the resource scheduling information sent by the MN, the MN receives the scheduling information of the radio resources of the cells of the SCG2 sent by the SN2, and selects an appropriate control information format to send the scheduling information to the UE. The configuration information of the SCG2 sent to the UE may be included in an SN2 addition request acknowledge message. Alternatively, a container form may be used that includes the bearer indication of the resource scheduling information of the SCG2.

Step 606: The SN2 sends an SN addition request acknowledge message to the MN, where the SN addition request acknowledge message includes cell group configuration information (CG-Config) of the SCG2 sent to the UE. It includes the bearer indication of the resource scheduling information of the SCG2, if step 605 indicates that the SN2 sends the resource scheduling information of the cells of the SCG2 to the UE, the CG-Config includes PDCCH information; if it indicates that the MN or the SN1 sends, when performing data transmission, the SN2 needs to send the scheduling information to the MN or the SN1, and then the MN or the SN1 forwards the scheduling information to the UE.

Step 607: The MN sends a radio resource control (RRC) reconfiguration message to the UE, where the RRC reconfiguration message includes at least one of the following information:
- an SCG2 ID of the added SN2 and the cell group configuration information (CG-Config) of the SCG2;
- an SCG1 ID of the SN1 and modified cell group configuration information (CG-Config) of an SCG1; and
- a master cell group configuration modified information of an MCG of the MN.

Alternatively, a container form may be used to place the cell group configuration information of the SCG1 and the SCG2, in one container together or in different containers according to the SN1 and the SN2. The CG-Config of the SCG2 includes which node, among the MN, the SN1, and the SN2, sends the resource scheduling information of the SCG2. Alternatively, if the CG-Config of the SCG2 includes the PDCCH information, it is considered that the resource scheduling information of the cells of the SCG2 is transmitted on the SCG2 (the SN2).

Step 608: The UE sends an RRC reconfiguration complete message to the MN, where the RRC reconfiguration complete message includes RRC reconfiguration complete messages sent to the SN1 and the SN2, indicating that the UE has completed the configuration of the SCG2 and/or the SCG1. Alternatively, a container form may be used for the message. RRC response messages for the SN1 and the SN2 may be placed in one container or may be respectively placed in two containers according to the SN1 and the SN2. Alternatively, the message may be an RRC reconfiguration complete (RRCReconfigurationComplete)/RRC connection reconfiguration complete (RRCConnectionReconfigurationComplete) message, or may be an uplink information transfer message (ULInformationTransferMRMC) for multi-connectivity or may be another message used for indicating that RRC reconfiguration is completed.

Step 609: The MN sends an SN addition indication message to the SN1, indicating that SN2 addition is completed. The SN addition indication message includes at least one of the following information:
- an indication of SN2 addition completion;
- an information of the SN2, including SCG2 ID information and SN2 ID information; and
- a bearer indication of the resource scheduling information, used for informing whether the scheduling information of the radio resources of the cells of the SCG2 is sent by the SN1.

If the SN1 sends the scheduling information, the SN1 receives the scheduling information of the radio resources of the cells of the SCG2 from the SN2, and selects an appropriate control information format to send the scheduling information to the UE. Alternatively, the message may be an SN reconfiguration complete message (S-NODE RECONFIGURATION COMPLETE) or may be another message used for indicating that SN addition is completed.

Step 610: The MN sends an SN reconfiguration complete message to the SN2, where the SN reconfiguration complete message includes the response message for the SN2 from the UE forwarded by the MN, indicating that the UE has completed the configuration of the SCG2. Alternatively, the message may be an SN reconfiguration complete message (S-NODE RECONFIGURATION COMPLETE) or may be another message used for indicating that SN reconfiguration is completed.

Figure 7:
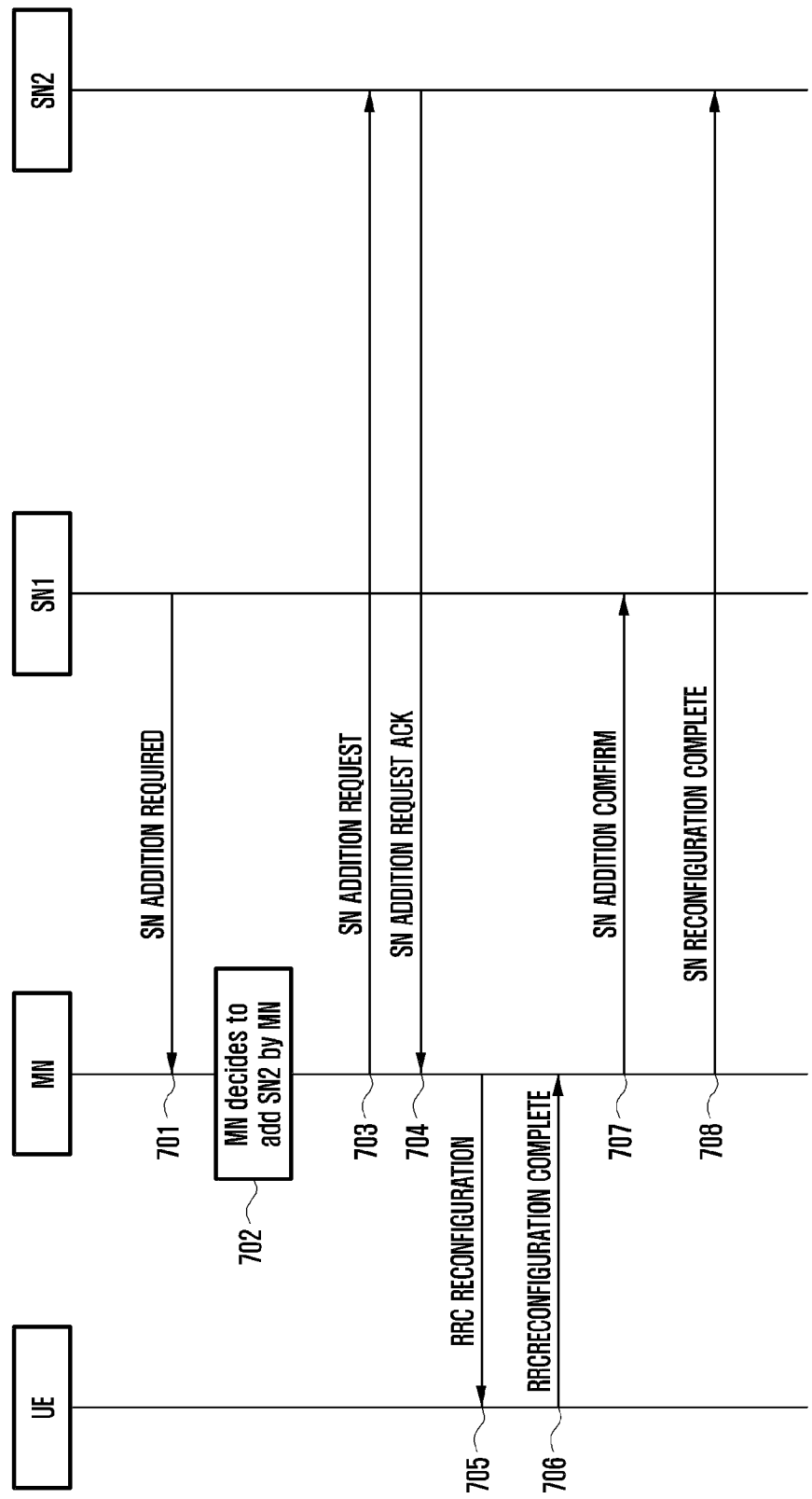
FIG. 7 illustrates a schematic diagram of a method for adding a new node according to an embodiment of the present disclosure.

FIG. 7 illustrates a schematic diagram of a method for adding a new node according to an embodiment of the present disclosure. An SN1 triggers an SN2 addition requirement to an MN, after evaluation by MN, the SN1 decides to add an SN2, and the MN is the execution node to perform SN2 addition. Steps included in the method are shown in FIG. 7.

Step 701: The SN1 sends an SN addition required message to the MN. The SN1 sends a requirement to the MN for service bearers modification and recommends the MN to consider adding an SN2, by evaluating the load status itself or according to factors such as a movement speed of UE and a frequency or coverage of a serving cell of the SN1 and the like, in order to alleviate the load status of the SN1 or reduce signaling overheads caused by service interruption and node change due to the movement of the UE. The message includes at least one of the following information:
- an SN2 addition required indication;
- a candidate SN list or candidate cell list (candidate SN/cell list) or a measurement result; and
- an information of SN1 establishing signaling radio bearer (SRB)3, indicating whether an SRB3 has been established.

Alternatively, the message may be an SN modification required message (S-NODE MODIFICATION REQUIRED) or may be an SN addition required message (S-NODE ADDITION REQUIRED) or may be another message used for requiring SN addition/modification. Among them, an SN modification request message may use a manner of providing "SN2 addition required indication" or providing "a candidate SN list or candidate cell list information or a measurement result" to recommend the MN to add a node SN2.

Step 702: The MN decides to add an SN2. The MN performs evaluation according to the information provided by the SN1 in step 701 to decide to add SN2 and execute by the MN. According to a measurement result provided by the UE, the MN may preferentially select, from the candidate SN list or candidate cell list obtained in step 701, an SN having an interface with the MN as a target SN2, to facilitate subsequent message and data interaction directly between the nodes. The MN further needs to determine, according to a UE capability, which node, among the MN, the SN1, and the SN2, sends the resource scheduling information of an SCG2 configured by the SN2 to the UE.

Step 703: The MN sends an SN addition request message (S-NODE ADDITION REQUEST) to the target SN2, where the SN addition request message includes the bearer indication of the resource scheduling information of the SCG2 for indicating which node among the MN, the SN1, and the SN2, sends the uplink and downlink resources scheduling information of cells of the SCG2 to the UE, to facilitate the coordination of uplink transmission scheduling of the UE between the nodes, prevent the uplink transmission capability of the UE from being exceeded due to being simultaneously scheduled by multiple nodes, and help to reduce blind detection overheads of the UE for PDCCH, thereby reducing power consumption. If the resource scheduling information sent by the MN or the SN1, the MN or the SN1 receives the scheduling information of the radio resources of the cells of the SCG2 sent by the SN2, and the MN or the SN1 selects an appropriate control information format to send the scheduling information to the UE. If the resource scheduling information sent by the SN2, the SN2 needs to configure a PDCCH in the SCG2. The message further includes service configuration information that needs to be carried on the SN2. Alternatively, a container form may be used for these service configuration information, including SN2 terminated, MN terminated, and SN1 terminated service configuration information or SN2 terminated and non-SN2 terminated service information, respectively. Alternatively, the message may use an SN addition request message (S-NODE ADDITION REQUEST) or may be another message used for requesting SN addition.

Step 704: The SN2 sends an SN addition request acknowledge message to the MN, where the SN addition request acknowledge message includes configuration information of the SN2 for services. Alternatively, a container form may be used for the configuration information, including SN2 terminated, MN terminated, and SN1 terminated service configuration information or SN2 terminated and non-SN2 terminated service configuration information, respectively. The configuration information further includes the SCG2 ID of the added SCG2 and the configuration information (CG-Config) of the SCG2 sent to the UE, wherein the configuration information includes the bearer indication of the resource scheduling information of the SCG2, used for indicating how the UE obtains the uplink and downlink resource scheduling information of the cells of the SCG2. If step 703 indicates that the SN2 sends the resource scheduling information of the cells of the SCG2 to the UE, the cell group configuration information (CG-Config) of the SCG2 sent to the UE includes configured PDCCH information; if indicates sending by the MN or the SN1, when performing the data transmission, the SN2 needs to send the scheduling information to the MN or the SN1, and the MN or the SN1 forwards to the UE. Alternatively, the message may use an SN addition request acknowledge message (S-NODE ADDITION REQUEST ACKNOWLEDGE) or may be another message used for acknowledging SN addition.

Step 705: The MN sends an RRC reconfiguration message to the UE, where the RRC reconfiguration message includes at least one of the following information:
an SCG2 ID of the added SCG2 and the cell group configuration information (CG-Config) of the SCG2;
an SCG1 ID of SCG1 and modified cell group configuration information (CG-Config) of the SCG1; and
a modified configuration information of an MCG of the MN.

Alternatively, a container form may be used to place the configuration information of the SCG1 and the SCG2, in one container together or in different containers according to the SCG1 and the SCG2. The CG-Config of the SCG2 includes which node, among the MCG, the SCG1, and the SCG2, transmits the resource scheduling information of the SCG2. Alternatively, if the configuration information of the SCG2 includes the PDCCH information, it is considered that the resource scheduling information of the cells of the SCG2 is transmitted on the SCG2 (the SN2).

Step 706: The UE sends an RRC reconfiguration complete message to the MN, where the RRC reconfiguration complete message includes RRC response messages sent to the SN1 and the SN2, indicating that the UE has completed the configuration of the SCG2 and/or the SCG1. Alternatively, a container form may be used for the message. The RRC response messages for the SN1 and the SN2 may be placed in one container or may be respectively placed in two containers according to the SN1 and the SN2. Alternatively, the message may be an RRC reconfiguration complete message (RRCReconfigurationComplete)/RRC connection reconfiguration complete message (RRCConnectionReconfigurationComplete), or may be an uplink information transfer message (ULInformationTransferMRMC) for multi-connectivity or may be another message used for indicating that RRC reconfiguration is completed.

Step 707: The MN sends an SN addition confirm message to the SN1, indicating that SN2 addition is completed. The SN addition confirm message includes at least one of the following information:
an indication of SN2 addition completion;
an information of the SN2, including SCG2 ID information and SN2 ID information; and
a bearer indication of the resource scheduling information, used for informing whether the scheduling information of the radio resources of the cells of the SCG2 is sent by the SN1.

Alternatively, the message may be an SN modification confirm message (S-NODE MODIFICATION CONFIRM) or may be an SN addition confirm message (S-NODE ADDITION CONFIRM) or may be another message used for confirming SN addition/modification.

Step 708: The MN sends a reconfiguration complete message to the SN2, where the reconfiguration complete message includes the RRC response message for the SN2 from the UE forwarded by the MN, indicating that the UE has completed the configuration of the SCG2. Alternatively, the message may be an SN reconfiguration complete message (S-NODE RECONFIGURATION COMPLETE) or may be another message used for indicating that SN reconfiguration is completed.

Figure 8:
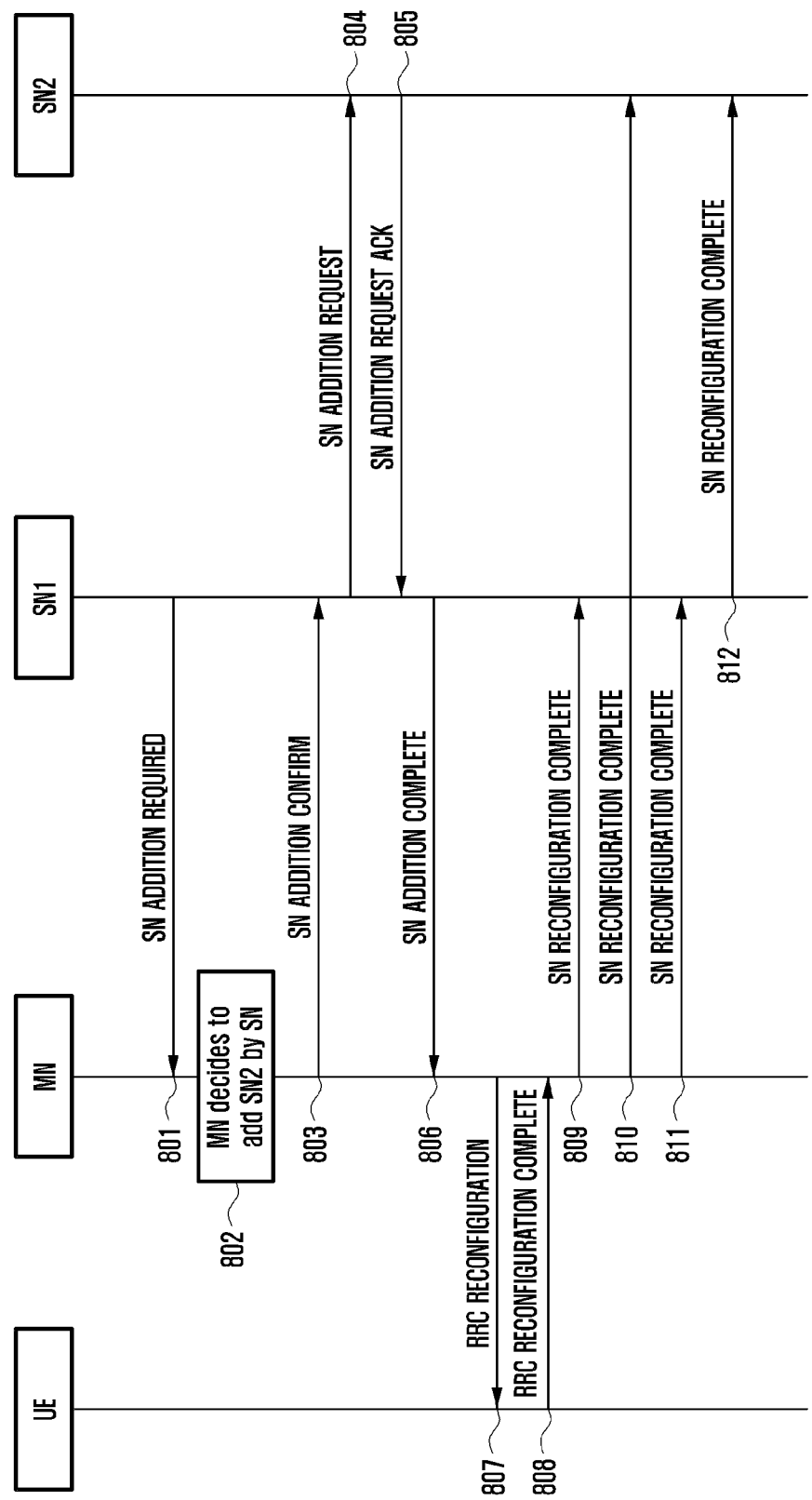
FIG. 8 illustrates a schematic diagram of a method for adding a new node according to an embodiment of the present disclosure.

FIG. 8 illustrates a schematic diagram of a method for adding a new node according to an embodiment of the present disclosure. An SN1 triggers an SN2 addition requirement to an MN. After evaluation by the MN, the SN1 decides to add an SN2, the SN1 is the execution node, and the MN is involved in performing SN2 addition. Steps included in the method are shown in FIG. 8.

Step 801: The SN1 sends an SN addition required message to the MN. The SN1 sends a requirement to the MN for service bearers modification and recommends the MN to consider adding an SN2, by evaluating the load status of the SN1 or according to factors such as a movement speed of UE and a frequency or coverage of a serving cell of the SN1 and the like, in order to alleviate the load status of the SN1 or reduce signaling overheads caused by service interruption and node change due to the movement of the UE. The message includes at least one of the following information:
  an SN2/SCG2 addition required indication;
  a candidate SN list or candidate cell list or a measurement result; and
  an information of SN1 establishing SRB3, indicating whether an SRB3 has been established on SN1.

Alternatively, the message may be an SN modification required message (S-NODE MODIFICATION REQUIRED) or may be an SN addition required message (S-NODE ADDITION REQUIRED) or may be another message used for requiring SN addition/modification. Among them, an SN modification request message may use a manner of providing "SN2/SCG2 addition required indication" or providing "a candidate SN list or candidate cell list information or a measurement result" to recommend the MN to add a node SN2.

Step 802: The MN decides to add an SN2. The MN performs evaluation according to the information provided by the SN1 in step 801 to decide to add SN2 and execute by the SN1. In consideration of adding an SN2 to reduce the load of the SN1 and other aspects, the MN may indicate the SN1 node as the execution node to perform an SN2 addition procedure, thereby reducing the processing load of the MN. Meanwhile, according to whether an SRB3 has been established on the SN1, and a service type carried on the SN2, and other factors, the MN decides whether to be involved in the SN2 addition procedure. According to a measurement result, the MN may preferentially select, from the candidate SN list or candidate cell list obtained in step 801, the SN having an interface with the MN as a candidate SN2 or candidate cell and provide a new candidate SN list or candidate cell list to the SN1 as reference for selecting a target SN2, to facilitate subsequent message and data interaction directly between the nodes. The MN further needs to determine, according to a UE capability, which node among the MN, the SN1, and the SN2, sends the uplink and downlink radio resources scheduling information of cells of the SCG2 configured by the SN2 to the UE.

Step 803: The MN sends an SN addition confirm message to the SN1 for indicating that the SN1 is an execution node to add an SN2, where the SN addition confirm message includes at least one of the following information:
  an SN2/SCG2 addition indication;
  an execution node indication;
  a candidate SN list or candidate cell list or a measurement result;
  an MN involvement indication; and
  a bearer indication of the resource scheduling information of the SCG2.

The SN2/SCG2 addition indication and the candidate SN list or candidate cell list or the measurement result are used for indicating that the SN1 is the execution node to perform the SN2 addition procedure, including selecting an SN2 according to the candidate SN list or candidate cell list provided by the MN; the MN involvement indication, indicating whether the MN or the SN1 sends a reconfiguration message to the UE, if the MN needs to be involved, the MN sends a reconfiguration message (including the configuration information of the SCG2) to the UE through SRB1, or otherwise the SN1 sends a reconfiguration message (including the configuration information of the SCG2) to the UE through SRB3; the bearer indication of the resource scheduling information of the SCG2, for indicating which node, among the MN, the SN1, and the SN2, sends the uplink and downlink resource scheduling information of the cells of the SCG2 to the UE. If the MN or the SN1 sends the scheduling information, the MN or the SN1 receives the scheduling information of the radio resources of the cells of the SCG2 from the SN2, and the MN or the SN1 selects an appropriate control information format to send the scheduling information to the UE. Alternatively, the message may be an SN modification confirm message (S-NODE MODIFICATION CONFIRM) or may be an SN addition confirm message (S-NODE ADDITION CONFIRM) or may be another message used for confirming SN addition/modification.

Step 804: If the SN addition confirm message received by the SN1 in step 803 includes the SN2/SCG2 addition indication and the candidate SN list or candidate cell list or the measurement result, it represents that the MN indicates that the SN1 is the execution node to add a new node. The SN1 performs SN selection according to the candidate SN list or candidate cell list provided by the MN. If an SN2 is selected as a node to be added, the SN1 sends an SN addition request message to the SN2, where the SN addition request message includes at least one of the following information.
  The bearer indication of the resource scheduling information of the SCG2, for indicating which node, among the MN, the SN1, and the SN2, sends the resource scheduling information of the cells of the SCG2 of the SN2; if the resource scheduling information sent by the SN2, the SN2 needs to configure a PDCCH in the SCG2, or otherwise it does not need to configure a PDCCH; if the resource scheduling information sent by the MN or the SN1, when performing data transmission, the SN2 needs to send the scheduling information to the MN or the SN1, and the MN or the SN1 forwards to the UE.
  Information of service that needs to be carried on the SN2, alternatively, a container form may be used for the service information, including SN2 terminated, MN terminated, and SN1 terminated service information or SN2 terminated and non-SN2 terminated service information, respectively.

Alternatively, the message may be an SN addition request message (S-NODE ADDITION REQUEST) or may be another message used for requesting SN addition.

Step 805: The SN2 sends an SN addition request acknowledge message to the SN1, where the SN addition request acknowledge message includes configuration information of the SN2 for services. Alternatively, a container form may be used for the configuration information, including SN2 terminated, MN terminated, and SN1 terminated service configuration information or SN2 terminated and non-SN2 terminated service configuration information, respectively. An SCG ID of an added SCG2 and configuration information (CG-Config) of the SCG2 sent to the UE are further included, which includes the bearer indication of the resource scheduling information of the SCG2, used for indicating the UE how to obtain the radio resources scheduling information of the cells of the SCG2. If step 804 indicates that the SN2 sends the resource scheduling information of the cells of the SCG2 to the UE, PDCCH information is configured in the CG-Config. Alternatively, the message may be an SN addition request acknowledge message (S-NODE ADDITION REQUEST ACKNOWLEDGE) or may be another message used for acknowledging SN addition.

Step 806: If "the MN involvement indication" in the SN addition confirm message received by the SN1 in step 803 indicates that the MN may be involved, which indicates that the MN sends an RRC reconfiguration message to the UE. The SN1 needs to send the configuration information of the SCG2 to the MN, and the MN sends to the UE. Therefore, the SN1 sends an SN addition complete message to the MN for informing that SN2 addition is completed, where the message includes at least one of the following information:
- an SN2/SCG2 addition complete indication;
- an SN2 ID;
- an SCG2 ID; and
- a configuration information (CG-Config) of the SCG2 sent to the UE, including the bearer indication of the resource scheduling information of the SCG2, used for indicating how the UE obtains the radio resources scheduling information of the cells of the SCG2.

Alternatively, the message may be an SN modification required message (S-NODE MODIFICATION REQUIRED) or may be an SN addition complete message (S-NODE ADDITION COMPLETE) or may be another message used for indicating that SN addition/modification is completed.

Step 807: The MN sends the RRC reconfiguration message to the UE. The MN sends the RRC reconfiguration message to the UE through an SRB1. The message includes at least one of the following information:
- an SCG ID of the added SCG2 and the configuration information (CG-Config) of the SCG2;
- an SCG ID of an SCG1 and modified configuration information (CG-Config) of the SCG1; and
- a modified configuration information of an MCG of the MN.

Alternatively, a container form may be used to place the configuration information of the SCG1 and the SCG2, in one container together or in different containers according to the SN1 and the SN2. The configuration information (CG-Config) of the SCG2 includes the bearer indication of the resource scheduling information of the SCG2, indicating the UE how to obtain the resource scheduling information of the cells of the SCG2. Alternatively, if the configuration information of the SCG2 includes the PDCCH information, it is considered that the resource scheduling information of the cells of the SCG2 is transmitted on the SCG2 (SN2).

Step 808: The UE sends an RRC reconfiguration complete message to the MN. The UE sends the RRC reconfiguration complete message to the MN through an SRB1. The RRC reconfiguration complete message includes RRC response messages sent to the SN1 and the SN2 by the UE, indicating that the UE has completed the configuration of the SCG2 and/or the SCG1. Alternatively, a container form may be used for the message. The RRC response messages for the SN1 and the SN2 may be placed in one container or may be respectively placed in two containers according to the SN1 and the SN2. Alternatively, the message may be an RRC reconfiguration complete (RRCReconfigurationComplete)/RRC connection reconfiguration complete (RRCConnectionReconfigurationComplete) message, or may be an uplink information transfer message (ULInformationTransferMRMC) for multi-connectivity or may be another message used for indicating that RRC reconfiguration is completed.

The MN forwards the response messages from the UE to the SN1 and the SN2 by steps 809 and 810 or by steps 811 and 812, where following steps are provided.

Step 809: The MN sends an SN reconfiguration complete message to the SN1, where the SN reconfiguration complete message includes the RRC response message for the SN1 from the UE. Alternatively, the message may be an SN reconfiguration complete message (S-NODE RECONFIGURATION COMPLETE) or may be SN modification confirm message (S-NODE MODIFICATION CONFIRM) or may be another message used for indicating that SN reconfiguration is completed or confirming SN modification.

Step 810: The MN sends an SN reconfiguration complete message to the SN2, where the reconfiguration complete message includes the RRC reconfiguration complete message for the SN2 from the UE, indicating that the UE has completed the configuration of the SCG2. Alternatively, the message may be an SN reconfiguration complete message (S-NODE RECONFIGURATION COMPLETE) or may be another message used for indicating that SN reconfiguration is completed.

Step 811: The MN sends an SN reconfiguration complete message to the SN1. The SN reconfiguration complete message includes the RRC response messages for the SN1 and the SN2 from the UE, indicating that the UE has completed the configuration of the SCG2 and/or the SCG1. Alternatively, the message may be an SN reconfiguration complete message (S-NODE RECONFIGURATION COMPLETE) or may be another message used for indicating that SN reconfiguration is completed.

Step 812: The SN1 sends an SN reconfiguration complete message to the SN2. The forwarded RRC response message for the SN2 from the UE, indicating that the UE has completed the configuration of the SCG2. Alternatively, the message may be an SN reconfiguration complete message (S-NODE RECONFIGURATION COMPLETE) or may be another message used for indicating that SN reconfiguration is completed.

Figure 9:
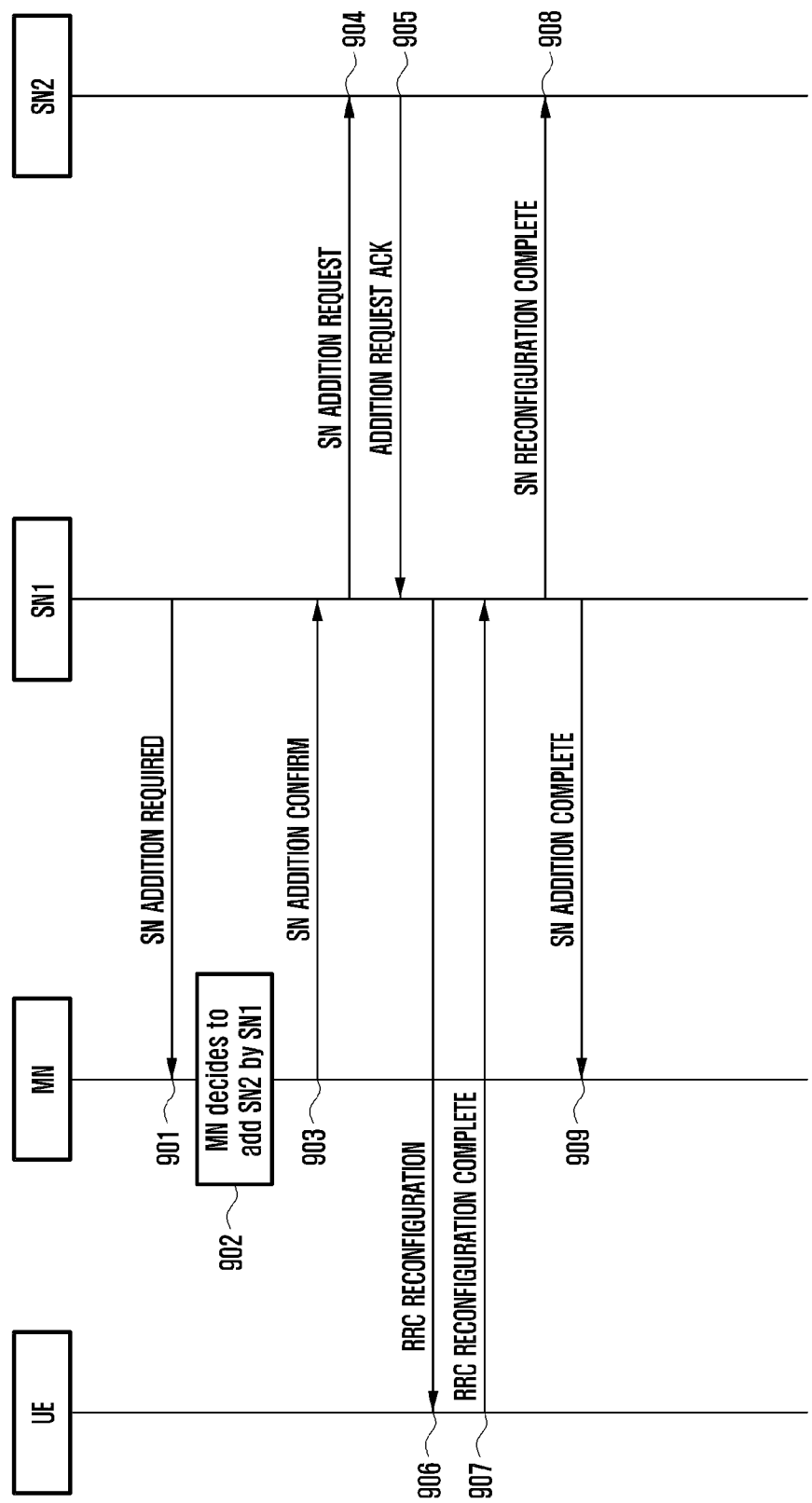
FIG. 9 illustrates a schematic diagram of a method for adding a new node according to an embodiment of the present disclosure.

FIG. 9 illustrates a schematic diagram of a method for adding a new node according to an embodiment of the present disclosure. An SN1 triggers an SN2 addition request to an MN. After evaluation, MN decides to add the SN2, the SN1 as the execution node to complete SN2 addition, and the MN is not involved. Steps included in the method are shown in FIG. 9, where following steps are provided.

Step 901: The SN1 sends an SN addition required message to the MN. The SN1 sends a requirement to the MN for service bearers modification and recommends the MN to consider adding an SN2, by evaluating the load status of the SN1 or according to factors such as a movement speed of UE and a frequency or coverage of a serving cell of the SN1 and the like, in order to alleviate the load status of the SN1 or reduce signaling overheads caused by service interruption and node change due to the movement of the UE. The message includes at least one of the following information:
- an SN2/SCG2 addition required indication;
- a candidate SN list or candidate cell list or a measurement result; and
- an information of SN1 establishing SRB3, indicating whether an SRB3 has been established on SN1.

Alternatively, the message may be an SN modification required message (S-NODE MODIFICATION REQUIRED) or may be an SN addition required message (S-NODE ADDITION REQUIRED) or may be another message used for requiring SN addition/modification. An SN modification request message may use a manner of providing "SN2/SCG2 addition required indication" or providing "a candidate SN list or candidate cell list information or a measurement result" to recommend the MN to add a node SN2.

Step 902: The MN decides to add an SN2. The MN performs evaluation according to the information provided by the SN1 in step 901 to decide to add SN2 and execute by the SN1. In consideration of adding an SN2 to reduce the load of the SN1 and other aspects, the MN may indicate that the node SN1 is the execution node to perform an SN2 addition procedure, thereby reducing the processing load of the MN. Meanwhile, according to whether an SRB3 has been established on the SN1, and a service type carried on the SN2, and other factors, the MN decides whether to be involved in the SN2 addition procedure. If the SRB3 is established on the SN1, the SN1 and the UE may directly exchange configuration information of an SCG2 without the involvement of the MN for configuration information forwarding, thereby reducing the processing load of the MN and reducing a configuration delay of the SCG2. According to a measurement result, the MN may preferentially select, from the candidate SN list or candidate cell list obtained in step 901, an SN having an interface with the MN as a candidate SN2 or candidate cell and provide a new candidate SN list or candidate cell list to the SN1 as reference for selecting a target SN2, to facilitate subsequent message and data interaction directly between the nodes. The MN further needs to determine, according to a UE capability, which node, among the MN, the SN1, and the SN2, sends the uplink and downlink radio resources scheduling information of cells of the SCG2 configured by the SN2 to the UE.

Step 903: The MN sends an SN addition confirm message to the SN1, indicating that the SN1 is an execution node to add an SN2, where the SN addition confirm message includes at least one of the following information:
an SN2/SCG2 addition indication;
an execution node indication;
a candidate SN list or candidate cell list or a measurement result;
an MN involvement indication; and
a bearer indication of the resource scheduling information of the SCG2.

The SN2/SCG2 addition indication and the candidate SN list or candidate cell list or the measurement result are used for indicating that the SN1 needs to be used as the execution node to perform the SN2 addition procedure, including selecting an SN2 from the candidate SN list or candidate cell list provided by the MN; the MN involvement indication, indicating whether the MN or the SN1 sends a reconfiguration message to the UE, if the MN needs to be involved, the MN sends an RRC reconfiguration message (including the configuration information of the SCG2) to the UE through SRB1, or otherwise the SN1 sends an RRC reconfiguration message (including the configuration information of the SCG2) to the UE through SRB3; the bearer indication of the resource scheduling information of the SCG2, indicating which node, among the MN, the SN1, and the SN2, sends the uplink and downlink radio resources scheduling information of the cells of the SCG2 to the UE. If the MN or the SN1 sends the scheduling information, the MN or the SN1 receives the scheduling information of the radio resources of the cells of the SCG2 from the SN2, and the MN or the SN1 selects an appropriate control information format to send the scheduling information to the UE. Alternatively, the message may be an SN modification confirm message (S-NODE MODIFICATION CONFIRM) or may be a new SN addition confirm message (S-NODE ADDITION CONFIRM) or may be another message used for confirming SN addition/modification.

Step 904: If the SN addition confirm message received by the SN1 in step 903 includes the SN2/SCG2 addition indication and the candidate SN list or candidate cell list or the measurement result, it represents that the MN indicates that the SN1 is the execution node to add a new node. The SN1 performs SN selection according to the candidate SN list or candidate cell list provided by the MN. If an SN2 is selected as a node to be added, the SN1 sends an SN2 addition request message to the SN2, where SN2 addition request message includes at least one of the following information.

The bearer indication of the resource scheduling information of the SCG2, for indicating which node, among the MN, the SN1, and the SN2, sends the resource scheduling information of the cells of the SCG2 of the SN2. If the resource scheduling information sent by the SN2, the SN2 needs to configure a PDCCH in the SCG2, or otherwise it does not need to configure a PDCCH; if the resource scheduling information sent by the MN or the SN1, the SN2 needs to send the scheduling information to the MN or the SN1, and the MN or the SN1 forwards to the UE.

Information of service that needs to be carried on the SN2. Alternatively, a container form may be used for the service information, including SN2 terminated, MN terminated, and SN1 terminated service information or SN2 terminated and non-SN2 terminated service information, respectively.

Alternatively, the message may be an SN addition request message (S-NODE ADDITION REQUEST) or may be another message used for requesting SN addition.

Step 905: The SN2 sends an SN addition request acknowledge message to the SN1, where the SN addition request acknowledge message includes configuration information of the SN2 for services. Alternatively, a container form may be used for the configuration information, including SN2 terminated, MN terminated, and SN1 terminated service configuration information or SN2 terminated and non-SN2 terminated service configuration information, respectively. An SCG ID of an added SCG2 and configuration information (CG-Config) of the SCG2 sent to the UE are further included, which includes the bearer indication of the resource scheduling information of the SCG2, used for indicating the UE how to obtain the resource scheduling information of the cells of the SCG2. If step 904 indicates that the SN2 sends the resource scheduling information of the cells of the SCG2 to the UE, PDCCH information is configured in the CG-Config. Alternatively, the message may be an SN addition request acknowledge message (S-NODE ADDITION REQUEST ACKNOWLEDGE) or may be another message used for acknowledging SN addition.

Step 906: If "the MN involvement indication" in the SN addition confirm message received by the SN1 in step 903 indicates that the MN may not be involved, which indicates that the SN1 sends the RRC reconfiguration message to the UE. Therefore, the SN1 sends the RRC reconfiguration message to the UE. Alternatively, the RRC reconfiguration message may be transmitted through SRB3 or may be transmitted through another signaling bearer SRB. The message includes at least one of the following information: the SCG ID of the added SCG2, the configuration information (CG-Config) of the SCG2, an SCG ID of SCG1, and modified configuration information (CG-Config) of the SCG1. Alternatively, a container form may be used to place the configuration information of the SCG1 and the SCG2, in one container together or in different containers according to the SCG1 and the SCG2. The configuration information (CG-Config) of the SCG2 includes the bearer indication of the resource scheduling information of the SCG2 used for indicating the UE how to obtain the resource scheduling information of the cells of the SCG2. Alternatively, if the configuration information of the SCG2 includes the PDCCH information, it is considered that the resource scheduling information of the cells of the SCG2 is transmitted on the SCG2. Alternatively, the reconfiguration message sent by the SN1 to the UE may be an RRC reconfiguration message, or may be a downlink information transfer message (DLInformationTransferMRMC) for multi-connectivity or may be another message used for requesting RRC reconfiguration.

In the case of the downlink information transfer message for multi-connectivity, the message includes a downlink dedicated control channel (DCCH) message list (dl-DCCH-MessageNR list), which includes a downlink DCCH message "dl-DCCH-MessageNR-MN" of the MN and a downlink DCCH message "dl-DCCH-MessageNR-SN1" of the SN1, or the downlink DCCH message of MN and the downlink DCCH message of SN1 are distinguished by CG ID. The configuration information of the SCG2 sent to the UE is included in the downlink DCCH message of the SN1.

In the case of using the RRC reconfiguration message, the message includes an RRCReconfiguration message sent by the SN2 to the UE.

Step 907: The UE sends a reconfiguration complete message to the SN1. Alternatively, the RRC reconfiguration message may be transmitted through SRB3 or may be transmitted through another signaling bearer SRB. The message includes RRC response messages sent to the SN1 and the SN2 by the UE, indicating that the UE has completed the configuration of the SCG2 and/or the SCG1. Alternatively, a container form may be used for the message. The RRC response messages for the SN1 and the SN2 may be placed in one container or may be respectively placed in two containers according to the SCG1 and the SCG2. The reconfiguration complete message related to the SN2 is forwarded to the SN2 by the SN1. Alternatively, the reconfiguration complete message sent by the UE to the SN1 may be an RRC reconfiguration complete message (RRCReconfigurationComplete)/RRC connection reconfiguration complete message (RRCConnectionReconfigurationComplete), or may be an uplink information transfer message (ULInformationTransferMRMC) message for multi-connectivity or may be another message used for indicating that reconfiguration is completed.

In the case of an uplink information transfer message for multi-connectivity, the message includes an uplink DCCH message list (ul-DCCH-MessageNR list), which includes an uplink DCCH message "ul-DCCH-MessageNR-MN" of the MN and an uplink DCCH message "ul-DCCH-MessageNR-SN1" of the SN1, or a CG ID is used to distinguish whether the uplink DCCH message is from the MN or the SN1. The information about that the configuration of the SCG2 is completed sent by the UE is included in the uplink DCCH message of the SN1.

In the case of using the RRC reconfiguration complete message, the message includes the RRCReconfigurationComplete message for the SN2 from the UE.

Step 908: The SN1 sends an SN reconfiguration complete message to the SN2, where the SN reconfiguration complete message includes the RRC reconfiguration complete message for SN2 from the UE, indicating that the UE has completed the configuration of the SCG2. Alternatively, the message may be an SN reconfiguration complete message (S-NODE RECONFIGURATION COMPLETE) or may be another message used for indicating that SN reconfiguration is completed.

Step 909: The SN1 sends an SN addition complete message to the MN, where the SN addition complete message includes at least one of the following information:

an indication to the MN that SN2 addition is completed and the UE has completed the configuration of the SCG2;

an information of the SN2, including SCG2 ID information and SN2 ID information; and a configuration information of the SN2, indicating information such as a service bearer of the SN2 and the like.

Alternatively, the message may be an SN addition complete indication message (S-NODE ADDITION COMPLETE) or may be another message used for indicating that SN addition is completed.

Figure 10:
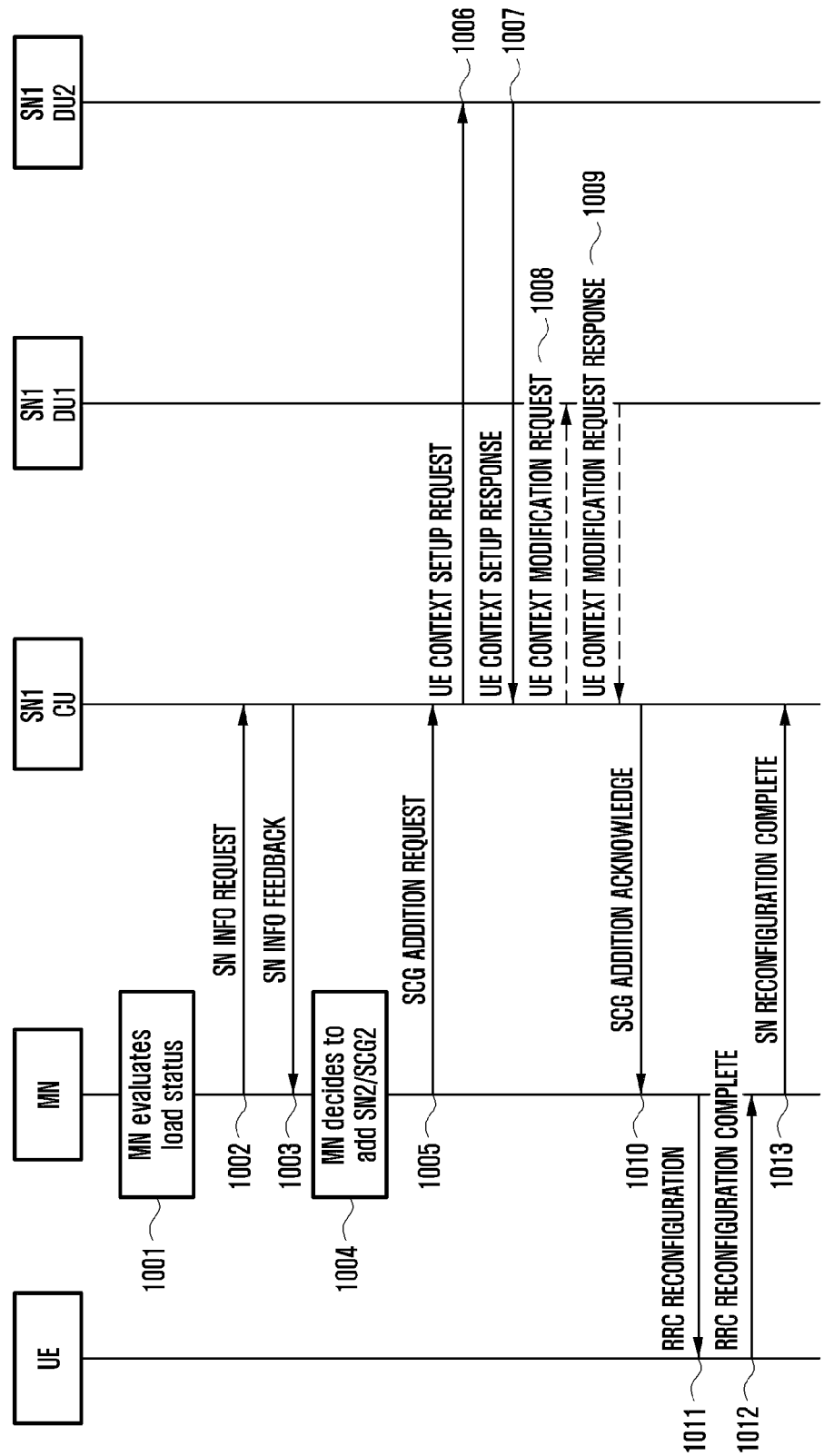
FIG. 10 illustrates a schematic diagram of a method for adding a new node according to an embodiment of the present disclosure.

FIG. 10 illustrates a schematic diagram of a method for adding a new node according to an embodiment of the present disclosure. In a CU/DU separation architecture, an SCG1 configured by a DU1 in the SN1. When an MN decides to add a new SN, the MN is the execution node, and the selected target cell belongs to SN1 (an SN1 distributed unit 2, an SN1 DU2). Steps included in the method are shown in FIG. 10, where following steps are provided.

Step 1001: The MN evaluates the load status. By evaluating the load status, the MN determines that the MN is overloaded or cannot bear a new service requirement of UE, and may consider triggering SN2 addition to alleviate the load of the MN.

Step 1002: The MN sends an SN information request to an SN1 CU. Step 1003: The SN1 sends an SN information feedback to the MN, where the SN information feedback includes at least one of the following information:

the load status of the SN1; and a list of SNs having an interface with the SN1.

The information is respectively used for the MN to evaluate whether it is necessary to add an SN2 and select an appropriate node SN2 to be added.

Step 1004: The MN decides to add an SN2. When the MN decides, according to the obtained information of the SN1, it is necessary to add a node SN2. The MN selects a target SN2 from the list of SNs having an interface with the SN1 obtained in step 1003, according to a measurement result provided by the UE. The MN may alternatively determine, according to the mobility of the UE and the frequency or coverage information of a serving cell of the SN1, whether it is necessary to add a node SN2, so that signaling overheads caused by service interruption and node change due to the movement of the UE is reduced, and when SN2 addition is triggered for this reason, steps 1001 to 1003 may be omitted. In the step, the MN determines that SN1 is the SN which the target cell belongs to. The MN further needs to determine, according to a UE capability, which one of the MCG, the SCG1, or SCG2 sends the uplink and downlink resources scheduling information of the SCG2 to the UE.

Step 1005: The MN sends an SCG addition request message to the SN1 CU, where the SCG addition request message includes at least one of the following information:

a user identity that has been assigned to the UE by the SN1 (S-NG-RAN node UE XnAP ID);

an SN2/SCG2 addition indication;

a candidate cell list information or a measurement result; and a bearer indication of the resource scheduling information of the SCG2.

The user identity and the SN2/SCG2 addition indication are used for informing the SN1 that the process is to add an SCG2. The candidate cell list information or the measurement result is used as a reference for the SN1 to select a target cell. The bearer indication of the resource scheduling information of the SCG2 is used for indicating which one of MCG, SCG1, or SCG2 sends the resource scheduling information of cells of the SCG2, to facilitate the coordination of uplink transmission scheduling of the UE between the SCGs, prevent an uplink transmission capability of the UE from being exceeded due to being simultaneously scheduled by multiple SCGs, and help to reduce blind detection overheads of the UE for PDCCH, thereby reducing the UE power consumption. If the resource scheduling information sent by the SCG2, a PDCCH needs to be configured in the SCG2, if the resource scheduling information sent by the MCG or the SCG1, the scheduling information of the SCG2 is sent to the MN or the SN1 DU1 by a node to which the SCG2 belongs, and then the MCG or the SCG1 selects an appropriate control information format to send the scheduling information to the UE. Alternatively, the message may be an SN modification request message or may be an SN addition request message or may be an SCG addition request message or may be another message used for requesting SN addition/modification or SCG addition. The SN1 central unit SN1 CU determines, according to the candidate cell list information or a measurement result of the added SCG2, the DU2 to which the target cell belongs.

Step 1006: The SN1 central unit (SN1 CU) sends a UE context setup request message to the SN1 distributed unit 2 (the SN1 DU2) to which the target cell belongs, where the UE context setup request message includes the bearer indication of the resource scheduling information of the SCG2. If the resource scheduling sent by the SCG2, a PDCCH needs to be configured in the SCG2, or otherwise a PDCCH does not need to be configured; if the resource scheduling sent by the MCG or the SCG1, when performing the data transmission, the SN1 DU2 needs to send the scheduling information to the SN1 CU, the SN1 CU sends the scheduling information to the MN or the SN1 DU1, and the MN or the SN1 forwards to the UE.

Step 1007: The SN1 DU2 sends a UE context setup response to the SN1 CU. The UE context setup response includes RRC information sent by the DU2 to the CU (DU to CU RRC Information). The RRC information includes the bearer indication of the resource scheduling information of the SCG2 which may be sent to the UE to indicate which node, among the MCG, the SCG1, and the SCG2, transmits the resource scheduling information of the SCG2. If step 1006 indicates that the SCG2 sends the resource scheduling information of the cells to the UE, the RRC information sent by the DU2 to the CU includes a PDCCH information.

Step 1008: The SN1 CU sends a UE context modification request message to the SN1 DU1. If the resource scheduling information of the SCG2 needs to be transmitted by the SCG1, the SN1 CU needs to send the message to the SN1 DU1 for indication.

Step 1009: The SN1 DU1 sends a UE context modification response message to the SN1 CU.

Step 1010: The SN1 CU sends an SCG addition acknowledge message to the MN, where the SCG addition acknowledge message includes at least one of the following information:
 an SN2/SCG2 addition complete indication;
 an SCG2 ID;
 an SN2 ID;
 a cell group configuration information (CG-Config) of the SCG2 sent to the UE, where the cell group configuration information includes the bearer indication of the resource scheduling information of the SCG2; and
 a configuration information of the SN2, indicating information such as a service bearer of the SN2 and the like.

Alternatively, the message may be an SN modification acknowledge message or may be an SN addition request acknowledge message or may be an SCG addition request acknowledge message or may be another message used for acknowledging an SN addition/modification request or SCG addition request.

Step 1011: The MN sends an RRC reconfiguration message to the UE, where the RRC reconfiguration message includes at least one of the following information:
 an added SCG2 ID and the cell group configuration information (CG-Config) of the SCG2;
 an SCG1 ID of the SCG1 and the modified cell group configuration information (CG-Config) of the SCG1; and
 a master cell group configuration modified information of an MCG of the MN.

Alternatively, a container form may be used to place the cell group configuration information of the SCG1 and the SCG2, in one container together or in different containers according to the SCG1 and the SCG2. The CG-Config of the SCG2 includes which one of the MCG, the SCG1, and the SCG2 transmits the scheduling information of the SCG2. Alternatively, if the PDCCH information is configured in the CG-Config of the SCG2, it is considered that the resource scheduling information of the cells of the SCG2 is transmitted on the SCG2.

Step 1012: The UE sends an RRC reconfiguration complete message to the MN, where the RRC reconfiguration complete message includes RRC reconfiguration complete messages sent to the SCG1 and/or the SCG2, indicating that the UE has completed the configuration of the SCG2 and/or the SCG1. Alternatively, a container form may be used for the message. RRC response messages for the SCG1 and the SCG2 may be placed in one container or may be respectively placed in two containers according to the SCG1 and the SCG2. Alternatively, the message may be an RRC reconfiguration complete (RRCReconfigurationComplete)/RRC connection reconfiguration complete (RRCConnectionReconfigurationComplete) message, or may be an uplink information transfer message (ULInformationTransferMRMC) for multi-connectivity or may be another message used for indicating that RRC reconfiguration is completed.

Step 1013: The MN sends an SN reconfiguration complete message to the SN1 CU, where the SN reconfiguration complete message includes the response message for the SCG2 from the UE forwarded by the MN, indicating that the UE has completed the configuration of the SCG2. Alternatively, the message may be an SN reconfiguration complete message (S-NODE RECONFIGURATION COMPLETE) or may be another message used for indicating that SN reconfiguration is completed.

Figure 11:
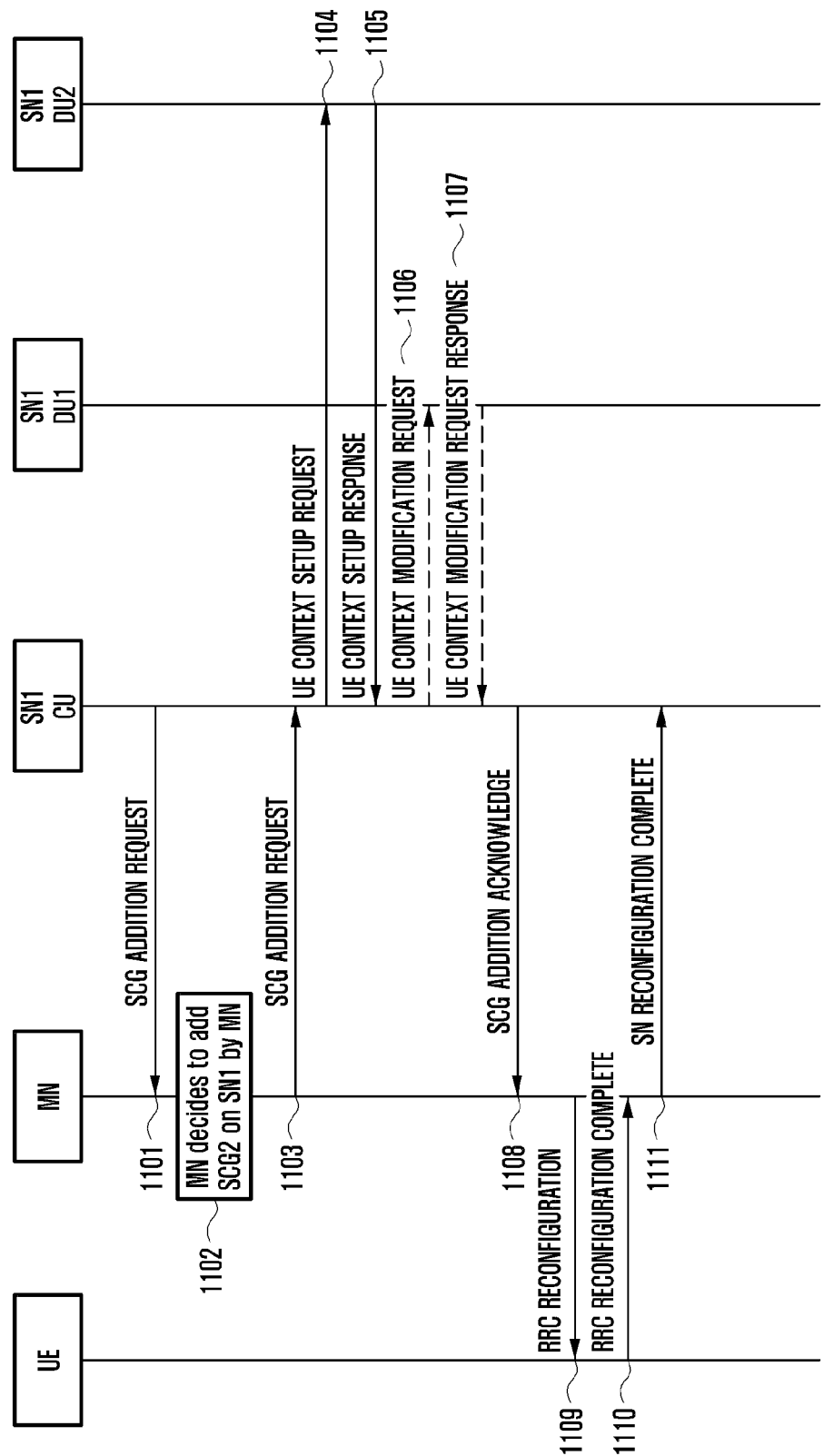
FIG. 11 illustrates a schematic diagram of a method for adding a new node according to an embodiment of the present disclosure.

FIG. 11 illustrates a schematic diagram of a method for adding a new node according to an embodiment of the present disclosure. In a CU/DU separation architecture, an SN1 triggers an SN2/SCG2 addition requirement to an MN. After evaluation by the MN, the MN decides to add an SCG2 on the SN1, and the MN is the execution node to perform SCG2 addition. Steps included in the method are shown in FIG. 11, where following steps are provided.

Step 1101: An SN1 CU sends an SCG addition required message to the MN. The SN1 sends a requirement to the MN for service bearers modification and recommends the MN to consider adding an SN2, by evaluating the load status of the SN1 or according to factors such as a movement speed of UE and a frequency or coverage of the serving cell of the SN1, in order to alleviate the load status of the SN1 or reduce signaling overheads caused by service interruption and node change due to the movement of the UE. The message includes at least one of the following information:

an SN2/SCG2 addition required indication;
a candidate SN list or candidate cell list or a measurement result; and
an information of SN1 establishing SRB3, indicating whether an SRB3 has been established on SN1.

Alternatively, the message may be an SN modification required message (S-NODE MODIFICATION REQUIRED) or may be an SN/SCG addition required message (S-NODE/SCG ADDITION REQUIRED) or may be another message used for requiring SN addition/modification or SCG addition. An SN modification request message may use a manner of providing "SN2/SCG2 addition required indication" or providing "a candidate SN list or candidate cell list information or a measurement result" to recommend the MN to add a node SN2 or an SCG2.

Step 1102: The MN decides to add an SN2. After performing evaluation according to the information provided by the SN1 in step 1101 and in combination with a measurement result provided by the UE, the MN decide to add SCG2 to the SN1 and execute by the MN. The MN needs to determine, according to a UE capability, which one of the MCG, the SCG1, and the SCG2 sends the uplink and downlink resources scheduling information of the SCG2 to the UE.

Step 1103: The MN sends an SCG addition request message to the SN1 CU, where the SCG addition request message includes at least one of the following information:
a user identity that has been assigned to the UE by the SN1 (S-NG-RAN node UE XnAP ID);
an SN2/SCG2 addition indication;
a candidate cell list information or a measurement result; and
a bearer indication of the resource scheduling information of the SCG2.

The user identity and the SN2/SCG2 addition indication are used for informing the SN1 that the process is to add an SCG2. The candidate cell list information or the measurement result is used as a reference for the SN1 to select a target cell. The bearer indication of the resource scheduling information of the SCG2 is used for indicating which one of the MCG, the SCG1, and the SCG2 sends the resource scheduling information of cells of the SCG2, to facilitate the coordination of uplink transmission scheduling of the UE between the SCGs, prevent an uplink transmission capability of the UE from being exceeded due to being simultaneously scheduled by multiple SCGs, and help to reduce blind detection overheads of the UE for PDCCH, thereby reducing the UE power consumption. If the resource scheduling information sent by the SCG2, a PDCCH needs to be configured in the SCG2 to send the scheduling information; if the resource scheduling information sent by the MCG or the SCG1, the scheduling information of the SCG2 is sent to the MN or an SN1 DU1 by a node to which the SCG2 belongs, and then the MCG or the SCG1 selects an appropriate control information format to send the scheduling information to the UE. Alternatively, the message may be an SN modification request message (S-NODE MODIFICATION REQUEST) or may be an SN/SCG addition request message (S-NODE/SCG ADDITION REQUEST) or may be another message used for requesting SN addition/modification or SCG addition. The SN1 central unit (SN1 CU) determines, according to the candidate cell list information or a measurement result of the added SCG2, a DU2 to which the target cell belongs.

Step 1104: The SN1 central unit (SN1 CU) sends a UE context setup request message to an SN1 distributed unit 2 (an SN1 DU2) to which the target cell belongs, where the UE context setup request message includes the bearer indication of the resource scheduling information of the SCG2. If the resource scheduling sent by the SCG2, a PDCCH needs to be configured in the SCG2, or otherwise a PDCCH does not need to be configured; if the resource scheduling sent by the MCG or the SCG1, the SN1 DU2 needs to send the scheduling information to the SN1 CU, the SN1 CU sends the scheduling information to the MN or the SN1 DU1, and the MN or the SN1 forwards to the UE.

Step 1105: The SN1 DU2 sends a UE context setup response to the SN1 CU. The UE context setup response includes RRC information sent by the DU2 to the CU. The RRC information includes the bearer indication of the resource scheduling information of the SCG2 which may be sent to the UE to indicate which one of the MCG, the SCG1, and the SCG2 transmits the resource scheduling information of the SCG2. If step 1104 indicates that the SCG2 sends the resource scheduling information of cells to the UE, the RRC information sent by the DU2 to the CU includes a PDCCH information.

Step 1106: The SN1 CU sends a UE context modification request message to the SN1 DU1. If the resource scheduling information of the SCG2 needs to be sent by the SCG1, the SN1 CU needs to send the message to the SN1 DU1 for indication.

Step 1107: The SN1 DU1 sends a UE context modification response message to the SN1 CU.

Step 1108: The SN1 CU sends an SCG addition acknowledge message to the MN, where the SCG addition acknowledge message includes at least one of the following information:
an SN2/SCG2 addition complete indication;
an SCG2 ID;
an SN2 ID;
a cell group configuration information (CG-Config) of the SCG2 sent to the UE, where the cell group configuration information includes the bearer indication of the resource scheduling information of the SCG2;
a configuration information of the SN2, indicating information such as a service bearer of the SN2; and
an SCG1 ID of the SN1 and the modified cell group configuration information (CG-Config) of the SCG1.

Alternatively, the message may be an SN modification request acknowledge message (S-NODE MODIFICATION REQUEST ACKNOWLEDGE) or may be an SN/SCG addition request acknowledge message (S-NODE/SCG ADDITION REQUEST ACKNOWLEDGE) or may be another message used for acknowledging an SN addition/modification request or an SCG addition request.

Step 1109: The MN sends an RRC reconfiguration message to the UE, where the RRC reconfiguration message includes at least one of the following information:
an added SCG2 ID and the cell group configuration information (CG-Config) of the SCG2;
an SCG1 ID of the SN1 and the modified cell group configuration information (CG-Config) of the SCG1; and
a master cell group configuration modified information of an MCG of the MN.

Alternatively, a container form may be used to place the cell group configuration information of the SCG1 and the SCG2, in one container together or in different containers according to the SCG1 and the SCG2. The CG-Config of the SCG2 includes which one of the MCG, the SCG1, and the SCG2 transmits the resource scheduling information of the SCG2. Alternatively, if the PDCCH information is configured in the CG-Config of the SCG2, it is considered that the resource scheduling information of the cells of the SCG2 is transmitted on the SCG2.

Step 1110: The UE sends an RRC reconfiguration complete message to the MN, where the RRC reconfiguration complete message includes RRC reconfiguration complete messages sent to the SCG1 and/or the SCG2, indicating that the UE has completed the configuration of the SCG2 and/or the SCG1. Alternatively, a container form may be used for the message. RRC response messages for the SCG1 and the SCG2 may be placed in one container or may be respectively placed in two containers according to the SCG1 and the SCG2. Alternatively, the message may be an RRC reconfiguration complete (RRCReconfigurationComplete)/RRC connection reconfiguration complete (RRCConnectionReconfigurationComplete) message, or may be an uplink information transfer message (ULInformationTransferMRMC) for multi-connectivity or may be another message used for indicating that RRC reconfiguration is completed.

Step 1111: The MN sends an SN reconfiguration complete message to the SN1 CU, where the SN reconfiguration complete message includes the response message for the SCG2 from the UE forwarded by the MN, indicating that the UE has completed the configuration of the SCG2. Alternatively, the message may be an SN reconfiguration complete message (S-NODE RECONFIGURATION COMPLETE) or may be another message used for indicating that SN reconfiguration is completed.

Figure 12:
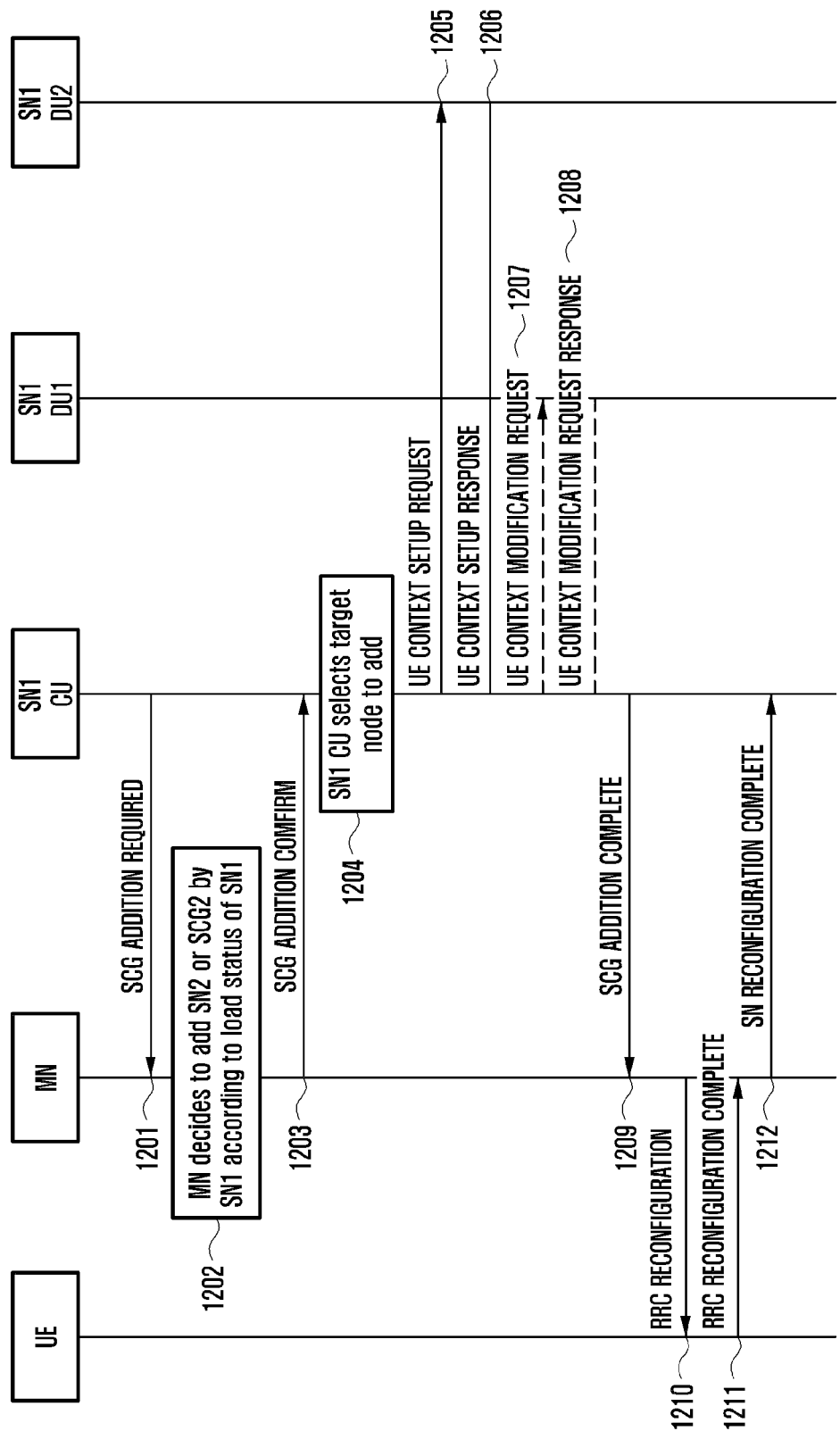
FIG. 12 illustrates a schematic diagram of a method for adding a new node according to an embodiment of the present disclosure.

FIG. 12 illustrates a schematic diagram of a method for adding a new node according to an embodiment of the present disclosure. In a CU/DU separation architecture, an SCG1 is configured by an SN1 DU1. If when an MN is involved in adding a new node and decides to add a new SN, an SN1 is the execution node (with the MN involvement), and a target cell selected by the SN1 CU (the SN1 CU-CP) belongs to the SN1 (SN1 DU2), steps included in the method are shown in FIG. 12. If SN1 CU may decide to add a new SN and execute the same by itself when the MCG configuration does not change, then MN may not be involved in adding a new SN. When the selected target node is located in SN1 (SN1 DU2), the method for adding a new node is as shown in steps 1204 to 1212 in FIG. 12 where following steps are provided.

Step 1201: The SN1 CU sends an SCG addition required message to the MN. The SN1 sends a requirement to the MN for service bearers modification and recommends the MN to consider adding an SN2, by evaluating the load status itself or according to factors such as a movement speed of UE and a frequency or coverage of the serving cell of the SN1, in order to alleviate the load status of the SN1 or reduce signaling overheads caused by service interruption and node change due to the movement of the UE. The message includes at least one of the following information:

an SN2/SCG2 addition required indication;
a candidate SN list or candidate cell list or a measurement result; and
an information of SN1 establishing SRB3, indicating whether an SRB3 has been established on SN1.

Alternatively, the message may be an SN modification required message (S-NODE MODIFICATION REQUIRED) or may be an SN/SCG addition required message (S-NODE/SCG ADDITION REQUIRED) or may be another message used for requiring SN addition/modification or SCG addition. An SN modification request message may use a manner of providing "SN2/SCG2 addition required indication" or providing "a candidate SN list or candidate cell list information or a measurement result" to recommend the MN to add an SN2 or an SCG2.

Step 1202: The MN decides to add an SN2. After performing evaluation according to the information provided by the SN1 in step 1201, the MN decides to add SN2 or SCG2 and execute by the SN1. In consideration of adding an SN2 to reduce the load of the SN1 and other aspects, the MN may indicate that the node SN1 as the execution node to perform an SN2 addition procedure, thereby reducing the processing load of the MN. Meanwhile, according to whether an SRB3 has been established on the SN1, a service type carried on the SN2/SCG2, and other factors, the MN decides whether the MN may be involved in the SN/SCG2 addition procedure. According to a measurement result, the MN may preferentially select, from the candidate SN list or candidate cell list obtained in step 1201, the SN having an interface with the MN as a candidate SN2 or candidate cell and provide a new candidate SN or candidate cell list to the SN1 as reference for selecting a target SN2, to facilitate subsequent message and data interaction directly between the nodes. The MN needs to determine, according to a UE capability, which one of an MCG, the SCG1, and the SCG2 sends the uplink and downlink radio resources scheduling information of cells of the SCG2 to the UE.

Step 1203: The MN sends an SCG addition confirm message to the SN1 CU for indicating that the SN1 (the SN1 CU/the SN1 CU-CP) is an execution node to add an SN2, where the SCG addition confirm message includes at least one of the following information:

an SN2/SCG2 addition indication;
an execution node indication;
a candidate SN list or candidate cell list or a measurement result;
an MN involvement indication; and
a bearer indication of the resource scheduling information of the SCG2.

The SN2/SCG2 addition indication and the candidate SN list or candidate cell list are used for indicating that the SN1 needs to be the execution node to perform the SN2 or SCG2 addition procedure, including selecting the SN1 DU2 from the candidate SN list or candidate cell list information provided by the MN to add an SCG2; the MN involvement indication, for indicating whether the MN or the SN1 sends a reconfiguration message to the UE, if it indicates that the MN needs to be involved, the MN sends an RRC reconfiguration message (including the configuration information of the SCG2) to the UE through SRB1, or otherwise the SN1 (the SN1 CU/the SN1 CU-CP) sends an RRC reconfiguration message (including the configuration information of the SCG2) to the UE through SRB3, the bearer indication of the resource scheduling information of the SCG2, for indicating which one of the MCG, the SCG1, and the SCG2 sends the resource scheduling information of the cells of the SCG2 to the UE, to facilitate the coordination of uplink transmission scheduling of the UE between the SCGs, prevent an uplink transmission capability of the UE from being exceeded due to being simultaneously scheduled by multiple SCGs, and help to reduce blind detection overheads of the UE for PDCCH, thereby reducing the UE power consumption. If the resource scheduling information sent by the SCG2, a PDCCH needs to be configured in the SCG2 to send the scheduling information, if the resource scheduling information sent by the MCG or the SCG1, the scheduling information of the SCG2 is sent to the MN or the SN1 DU1 by a node to which the SCG2 belongs, and then the MCG or the SCG1 selects an appropriate control information format to send the scheduling information to the UE.

Alternatively, the message may be an SN modification confirm message (S-NODE MODIFICATION CONFIRM) or may be an SN/SCG addition confirm message (S-NODE/SCG ADDITION CONFIRM) or may be another message used for confirming SN addition/modification or confirming SCG addition.

Step 1204: If the SCG addition confirm message received by the SN1 CU in step 1203 includes the SN2/SCG2 addition indication and the candidate SN list or candidate cell list or the measurement result, it represents that the MN indicates that the SN1 (the SN1 CU) is the execution node to add a new node. The SN1 (the SN1 CU) selects and determines a node to which the target cell belongs, according to the candidate SN list or candidate cell list or the measurement result obtained in step 1203 and in combination with information such as a measurement result obtained by itself. Alternatively, SN1 considers to add a new mode directly when the MCG configuration does not change, by evaluating the load status itself, or according to factors such as a movement speed of UE and a frequency or coverage of the serving cell of the SN1, to alleviate the load status of the SN1, or to reduce the service interruption and the signaling overheads caused by node change due to the movement of the UE.

Step 1205: If the added node selected by the SN1 according to step 1204 is the SN1 DU2, the SN1 central unit (SN1 CU) sends a UE context setup request message to the SN1 distributed unit 2 (the SN1 DU2) to which the target cell belongs, and establishes the SCG2 for the UE in the SN1 DU2, where the UE context setup request message includes the bearer indication of the resource scheduling information of the SCG2 (the SN1 DU2), indicating which one of the MCG, the SCG1, and the SCG2 sends the resource scheduling information of the cells of the SCG2 to the UE. If the resource scheduling sent by the SCG2 (the SN1 DU2), a PDCCH needs to be configured in the SCG2, or otherwise a PDCCH does not need to be configured, if the resource scheduling sent by the MCG or the SCG1, the SN1 DU2 needs to send the scheduling information to the SN1 CU during data transmission, the SN1 CU sends the scheduling information to the MN or the SN1 DU1, and the MN or the SN1 forwards to the UE.

Step 1206: The SN1 DU2 sends a UE context setup response to the SN1 CU. The UE context setup response includes RRC information sent by the DU2 to the CU. The RRC information includes the bearer indication of the resource scheduling information of the SCG2 which may be sent to the UE to indicate which one of the MCG, the SCG1, and the SCG2 transmits the resource scheduling information of the SCG2. If step 1205 indicates that the SCG2 sends the resource scheduling information of the cells to the UE, the RRC information sent by the DU2 to the CU includes a PDCCH information.

Step 1207: The SN1 CU sends a UE context modification request message to the SN1 DU1. If the resource scheduling information of the SCG2 (the SN1 DU2) needs to be sent by the SCG1 (the SN1 DU1), the SN1 CU needs to send the message to the SN1 DU1 for indication.

Step 1208: The SN1 DU1 sends a UE context modification response message to the SN1 CU.

Step 1209: If "the MN involvement indication" in the SCG addition confirm message received by the SN1 CU in step 1203 indicates that the MN may be involved, this indicates that the MN sends the RRC reconfiguration message to the UE; or if SN1 CU decides to add a new SN and executes the same by itself when the MCG configuration does not change, the SN1 needs to send the configuration information of the SCG2 to the MN, and the MN sends to the UE. Therefore, the SN1 CU sends an SCG addition complete message to the MN, where the SCG addition confirm message includes at least one of the following information:

an SN2/SCG2 addition complete indication;
an SN2 ID;
an SCG2 ID;
a cell group configuration information (CG-Config) of the SCG2 sent to the UE, including the bearer indication of the resource scheduling information of the SCG2;
a configuration information of the SN2, indicating information such as a service bearer of the SN2; and
an SCG1 ID of the SN1 and the modified cell group configuration information (CG-Config) of the SCG1.

Alternatively, the message may be an SN modification complete message (S-NODE MODIFICATION COMPLETE) or may be SN/SCG addition complete message (S-NODE/SCG ADDITION COMPLETE) or may be another message used for indicating that SN modification/addition or SCG addition is completed.

Step 1210: The MN sends an RRC reconfiguration message to the UE, where the RRC reconfiguration message includes at least one of the following information:

an added SCG2 ID and the cell group configuration information (CG-Config) of the SCG2;
an SCG1 ID of the SN1 and the modified cell group configuration information (CG-Config) of the SCG1; and
a master cell group configuration modified information of an MCG of the MN.

Alternatively, a container form may be used to place the cell group configuration information of the SCG1 and the SCG2, in one container together or in different containers according to the SN1 and the SN2. The CG-Config of the SCG2 includes which one of the MCG, the SCG1, and the SCG2 transmits the resource scheduling information of the SCG2. Alternatively, if the PDCCH information is configured in the CG-Config of the SCG2, it is considered that the resource scheduling information of the cells of the SCG2 is transmitted on the SCG2.

Step 1211: The UE sends an RRC reconfiguration complete message to the MN, where the RRC reconfiguration complete message includes RRC reconfiguration complete messages sent to the SCG1 and/or the SCG2, indicating that the UE has completed the configuration of the SCG2 and/or the SCG1. Alternatively, a container form may be used for the message. RRC response messages for the SCG1 and the SCG2 may be placed in one container or may be respectively placed in two containers according to the SCG1 and the SCG2. Alternatively, the message may be an RRC reconfiguration complete (RRCReconfigurationComplete)/RRC connection reconfiguration complete (RRCConnectionReconfigurationComplete) message, or may be an uplink information transfer message (ULInformationTransferMRMC) for multi-connectivity or may be another message used for indicating that RRC reconfiguration is completed.

Step 1212: The MN sends an SN reconfiguration complete message to the SN1 CU, where the SN reconfiguration complete message includes the response message for the SCG2 from the UE forwarded by the MN, indicating that the UE has completed the configuration of the SCG2. Alternatively, the message may be an SN reconfiguration complete message (S-NODE RECONFIGURATION COMPLETE) or may be another message used for indicating that SN reconfiguration is completed.

Figure 13:
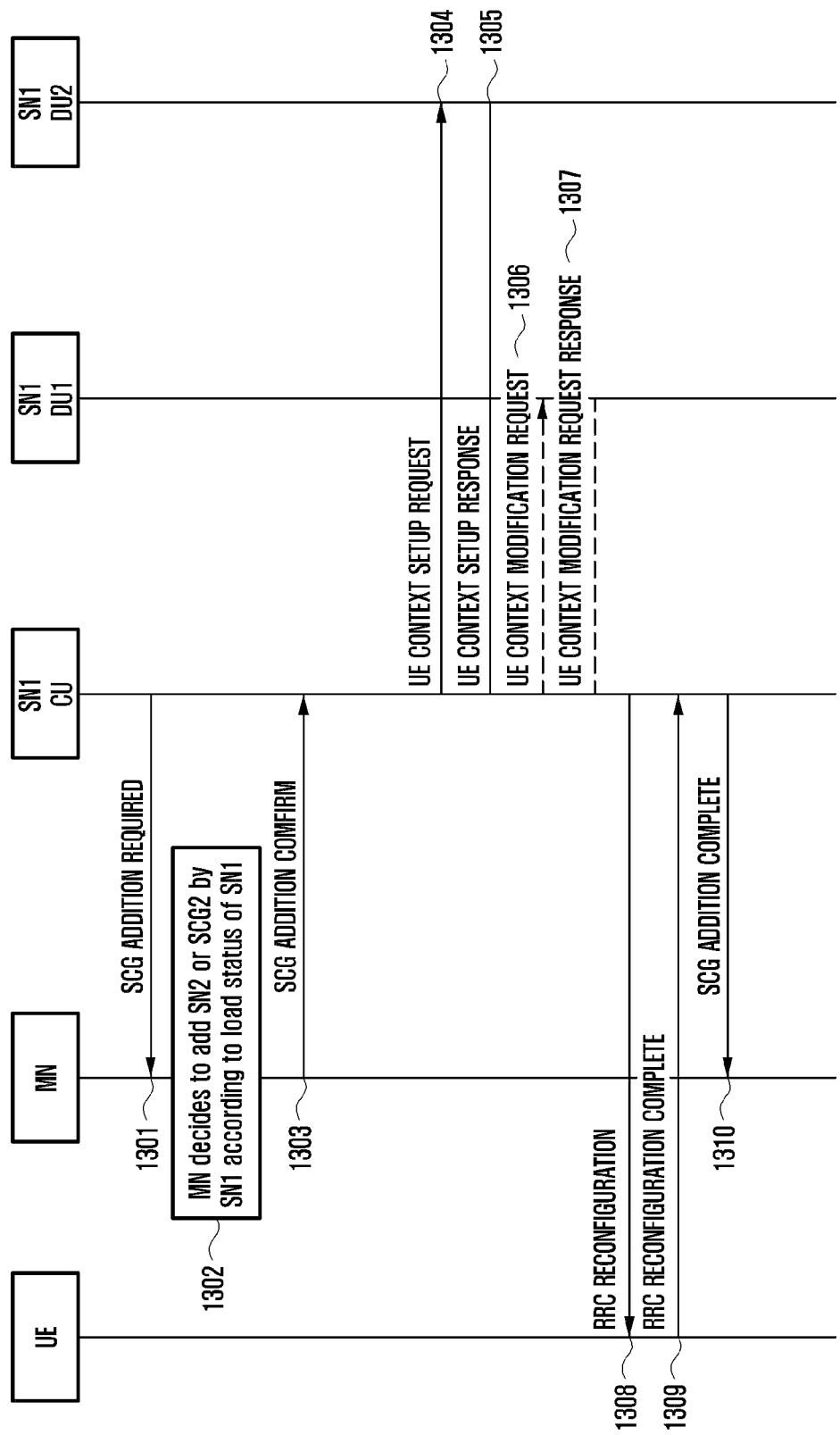
FIG. 13 illustrates a schematic diagram of a method for adding a new node according to an embodiment of the present disclosure.

FIG. 13 illustrates a schematic diagram of a method for adding a new node according to an embodiment of the present disclosure. In a CU/DU separation architecture, an SCG1 is configured by an SN1 DU1. If when an MN decides to add a new SN, an SN1 is the execution node (without the MN involvement), and a target cell selected by the SN1 CU (the SN1 CU-CP) belongs to the SN1 (an SN1 DU2), steps included in the method are shown in FIG. 13. If SN1 CU may decide to add a new SN and execute the same by itself when the MCG configuration does not change, when the selected target node is located in SN1 (SN1 DU2) and SN1 is configured with SRB3, the method for adding a new node is as shown in steps 1304 to 1309 in FIG. 13, where following steps are provided.

Step 1301: The SN1 CU sends an SN addition required message to the MN. The SN1 sends a requirement to the MN for service bearers modification and recommends the MN to consider adding an SN2, by evaluating the load status of the SN1 or according to factors such as a movement speed of UE and a frequency or coverage of the serving cell of the SN1, in order to alleviate the load status of the SN1 or reduce signaling overheads caused by service interruption and node change due to the movement of the UE. The message includes at least one of the following information:

an SN2/SCG2 addition required indication;
a candidate SN list or candidate cell list or a measurement result; and
an information of SN1 establishing SRB3, indicating whether an SRB3 has been established on SN1.

The candidate SN list or candidate cell may include the SN1 or a cell of the SN1. Alternatively, the message may be an SN modification required message (S-NODE MODIFICATION REQUIRED) or may be an SN/SCG addition required message (S-NODE/SCG ADDITION REQUIRED) or may be another message used for requiring SN addition/modification or SCG addition. The SN modification required message may use a manner of providing "SN2/SCG2 addition required indication" or providing "a candidate SN list or candidate cell list information or a measurement result" to recommend the MN to add a node SN2 or SCG2.

Step 1302: The MN decides to add an SN2. After performing evaluation according to the information provided by the SN1 in step 1301, the MN decide to add SN2 or SCG2 and execute by the SN1. In consideration of adding an SN2 to reduce the load of the SN1 and other aspects, the MN may indicate that the SN1 node as the execution node to perform an SN2 addition procedure, thereby reducing the processing load of the MN. In addition, according to whether an SRB3 has been established on the SN1 and a service type carried on the SN2/the SCG2, and other factors, the MN decides whether to be involved in the SN/SCG2 addition procedure. If the SRB3 is established on the SN1, the SN1 and the UE may directly interact configuration information of the SCG2 without the MN involvement for forwarding, thereby reducing the processing load of the MN and reducing a configuration delay of the SCG2. According to a measurement result, the MN may preferentially select, from a candidate SN list or candidate cell list obtained in step 1301, an SN also having an interface with the MN as a candidate SN2 or cell and provide a new candidate SN list or candidate cell list and provide to the SN1 as reference for selecting a target SN2, to facilitate subsequent message and data interaction directly between the nodes. The MN needs to determine, according to a UE capability, which one of the MCG, the SCG1, and the SCG2 sends the uplink and downlink radio resources scheduling information of cells of the SCG2 to the UE.

Step 1303: The MN sends an SCG addition confirm message to the SN1 CU for indicating that the SN1 (the SN1 CU/the SN1 CU-CP) is an execution node to add an SN2, where the SCG addition confirm message includes at least one of the following information:

an SN2/SCG2 addition indication;
an execution node indication;
a candidate SN list or candidate cell list or a measurement result;
an MN involvement indication; and
a bearer indication of the resource scheduling information of the SCG2.

The SN2/SCG2 addition indication and the candidate SN list or candidate cell list are used for indicating that the SN1 needs to be the execution node to perform the SN2 or SCG2 addition procedure, including selecting the SN1 DU2 from the candidate SN list or candidate cell list information provided by the MN to add an SCG2; the MN involvement indication, for indicating whether the MN or the SN1 sends a reconfiguration message to the UE, if it indicates that the MN needs to be involved, the MN sends an RRC reconfiguration message (including the configuration information of the SCG2) to the UE through SRB 1, or otherwise the SN1 (the SN1 CU/the SN1 CU-CP) sends an RRC reconfiguration message (including the configuration information of the SCG2) to the UE through SRB3, the bearer indication of the resource scheduling information of the SCG2, for indicating which one of the MCG, the SCG1, and the SCG2 sends the resource scheduling information of the cells of the SCG2 to the UE, to facilitate the coordination of uplink transmission scheduling of the UE between the SCGs, prevent an uplink transmission capability of the UE from being exceeded due to being simultaneously scheduled by multiple SCGs, and help to reduce blind detection overheads of the UE for PDCCH, thereby reducing the UE power consumption. If the resource scheduling information sent by the SCG2, a PDCCH needs to be configured in the SCG2 to send the scheduling information; if the resource scheduling information sent by the MCG or the SCG1, the scheduling information of the SCG2 is sent to the MN or the SN1 DU1 by a node to which the SCG2 belongs, and then the MCG or the SCG1 selects an appropriate control information format to send the scheduling information to the UE. Alternatively, the message may be an SN modification confirm message (S-NODE MODIFICATION CONFIRM) or may be an SN/SCG addition confirm message (S-NODE/SCG ADDITION CONFIRM) or may be another message used for confirming SN addition/modification or confirming SCG addition. The SN1 determines, according to the obtained candidate SN list or candidate cell list or a measurement result, that the target cell belongs to the SN1 DU2, and establishes the SCG2 for the UE in the DU2.

Step 1304: If the SCG addition confirm message received by the SN1 CU in step 1303 includes the SN2/SCG2 addition indication and the candidate SN list or candidate cell list or the measurement result, it represents that the MN indicates that the SN1 (the SN1 CU) is the execution node to add a new node. The SN1 (the SN1 CU) selects and determines a node to which the target cell belongs, according to the candidate SN list or candidate cell list or the measurement result provided by the MN and in combination with information such as a measurement result obtained by itself. If the selected node is the SN1 DU2, the node is used as an added node, and the SN1 CU sends a UE context setup request message to the SN1 DU2. The UE context setup request message includes the bearer indication of the resource scheduling information of the SCG2 (the SN1

DU2), indicating which one of the MCG, the SCG1, and the SCG2 sends the resource scheduling information of the cells of the SCG2 to the UE. If the SCG2 (the SN1 DU2) sends the resource scheduling information, a PDCCH needs to be configured in the SCG2, or otherwise a PDCCH does not need to be configured, if the MCG or the SCG1 sends the resource scheduling information, when performing the data transmission, the SN1 DU2 needs to send the scheduling information to the SN1 CU, the SN1 CU sends to the MN or the SN1 DU1, and the MN or the SN1 forwards to the UE. Alternatively, SN1 considers to add a new mode directly when the MCG configuration does not change, by evaluating the load status itself, or according to factors such as a movement speed of UE and a frequency or coverage of the serving cell of the SN1, to alleviate the load status of the SN1, or to reduce the service interruption and the signaling overheads caused by node change due to the movement of the UE.

Step 1305: The SN1 DU2 sends a UE context setup response to the SN1 CU. The UE context setup response includes RRC information sent by the DU2 to a CU. The RRC information includes the bearer indication of the resource scheduling information of the SCG2 which may be sent to the UE to indicate which one of the MCG, the SCG1, and the SCG2 transmits the resource scheduling information of the SCG2. If step 1304 indicates that the SCG2 sends the resource scheduling information of the cells to the UE, the RRC information sent by the DU2 to the CU includes a PDCCH information.

Step 1306: The SN1 CU sends a UE context modification request message to the SN1 DU1. If the resource scheduling information of the SCG2 (the SN1 DU2) needs to be sent by the SCG1 (the SN1 DU1), the SN1 CU needs to send the message to the SN1 DU1 for indication.

Step 1307: The SN1 DU1 sends a UE context modification response message to the SN1 CU.

Step 1308: If "the MN involvement indication" in the SN addition confirm message received by the SN1 in step 1303 indicates that the MN may not be involved; or if SN1 CU decides to add a new SN and executes the same by itself when the MCG configuration does not change, the SN1 sends an RRC reconfiguration message to the UE. Therefore, the SN1 CU sends the RRC reconfiguration message to the UE. Alternatively, the RRC reconfiguration message may be transmitted through SRB3 or may be transmitted through another signaling bearer SRB. The message includes at least one of the following information:
  an added SCG2 ID;
  a cell group configuration information (CG-Config) of the SCG2; and
  an SCG1 ID of the SN1 and the modified cell group configuration information (CG-Config) of the SCG1.

Alternatively, a container form may be used to place the cell group configuration information of the SCG1 and the SCG2, in one container together or in different containers according to the SN1 and the SN2. The CG-Config of the SCG2 includes the bearer indication of the resource scheduling information of the SCG2 is used for indicating which one of the MCG, the SCG1, and the SCG2 transmits the resource scheduling information of the cells of the SCG2. Alternatively, if the PDCCH information is configured in the CG-Config of the SCG2, it is considered that the resource scheduling information of the cells of the SCG2 is transmitted on the SCG2.

In the case of a downlink information transfer message for multi-connectivity, the message includes a downlink DCCH message list (dl-DCCH-MessageNR list), which includes a downlink DCCH message "dl-DCCH-MessageNR-MN" of the MN and a downlink DCCH message "dl-DCCH-MessageNR-SN1" of the SN1, or a CG ID is used to distinguish whether the downlink DCCH message is from the MN or the SN1. The configuration information of the SCG2 sent to the UE is included in the downlink DCCH message of the SN1.

In the case of using the RRC reconfiguration message, the message includes an RRCReconfiguration message sent by the SN2 to the UE.

Step 1309: The UE sends an RRC reconfiguration complete message to the SN1 CU. Alternatively, the RRC reconfiguration message may be transmitted through SRB3 or may be transmitted through another signaling bearer SRB. The message includes RRC reconfiguration complete messages sent to the SCG1 and/or the SCG2, indicating that the UE has completed the configuration of the SCG2 and/or the SCG1. Alternatively, a container form may be used for the message. RRC response messages for the SCG1 and the SCG2 may be placed in one container or may be respectively placed in two containers according to the SCG1 and the SCG2. Alternatively, the message may be an RRC reconfiguration complete (RRCReconfigurationComplete)/RRC connection reconfiguration complete (RRCConnectionReconfigurationComplete) message, or may be an uplink information transfer message (ULInformationTransferMRMC) for multi-connectivity or may be another message used for indicating that RRC reconfiguration is completed.

In the case of the uplink information transfer message for multi-connectivity, the message includes an uplink dedicated control channel (DCCH) message list (ul-DCCH-MessageNR list), which includes an uplink DCCH message "ul-DCCH-MessageNR-MN" of the MN and an uplink DCCH message "ul-DCCH-MessageNR-SN1" of the SN1, or a CG ID is used to distinguish whether the uplink DCCH message is from the MN or the SN1. The information about that the configuration of the SCG2 is completed sent by the UE is included in the uplink DCCH message of the SN1.

In the case of using the RRC reconfiguration complete message, the message includes the RRCReconfigurationComplete message for the SN2 from the UE.

Step 1310: The SN1 CU sends an SCG addition complete indication message to the MN, where the SCG addition complete indication message includes at least one of the following information:
  an indication to the MN that SCG2/SN2 addition is completed and the UE has completed the configuration of the SCG2;
  an information of the SN2, including SCG2 ID information and SN2 ID information; and
  a configuration information of the SN2, indicating information such as a service bearer of the SN2.

Alternatively, the message may be an SN modification complete message (S-NODE MODIFICATION COMPLETE) or may be SN/SCG addition complete message (S-NODE/SCG ADDITION COMPLETE) or may be an SCG addition complete message or may be another message used for indicating that SN modification/addition or SCG addition is completed.

Figure 17:
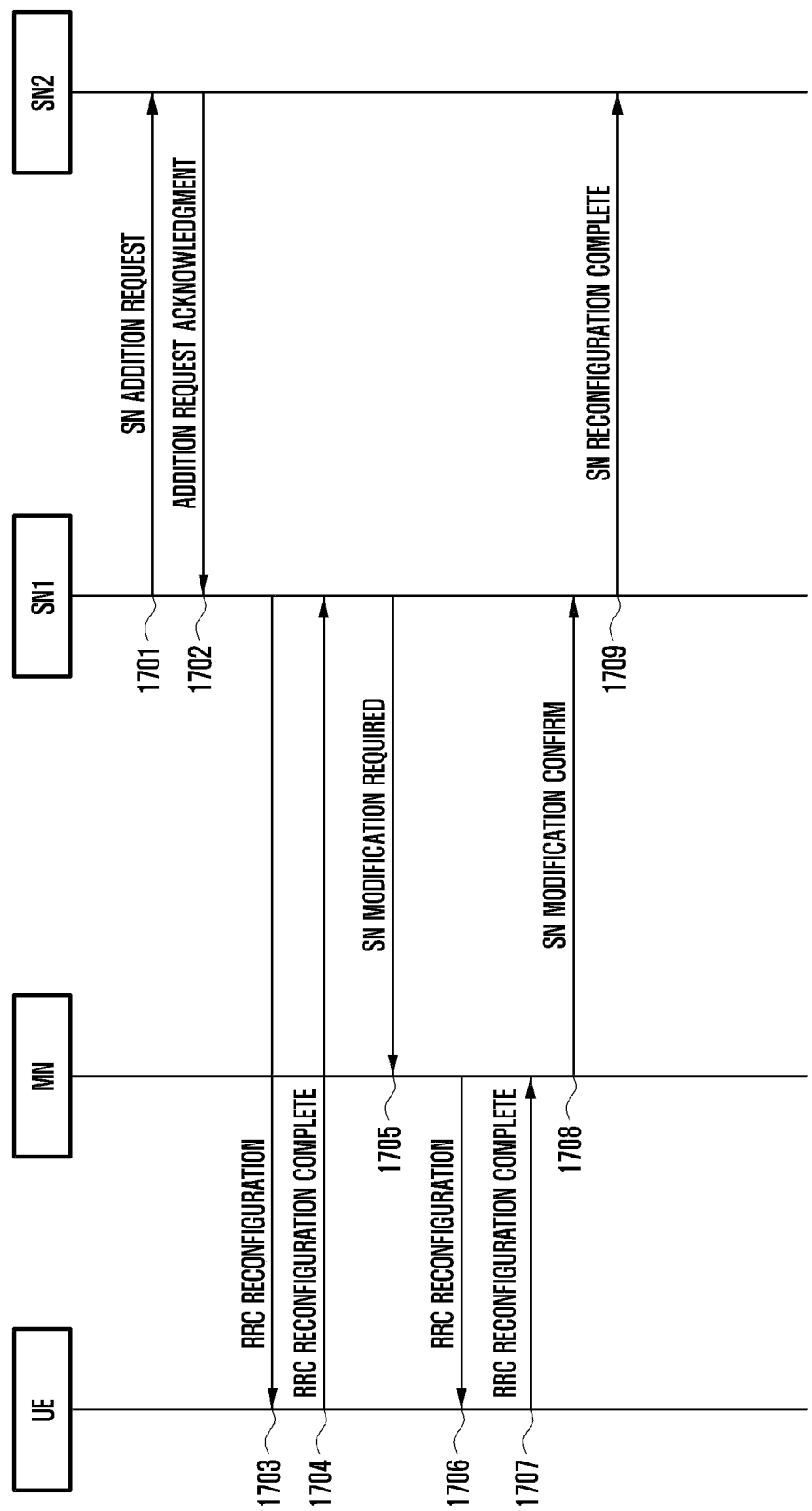
FIG. 17 illustrates a schematic diagram of a method for adding a new node according to an embodiment of the present disclosure.

FIG. 17 illustrates a schematic diagram of a method for adding a new node according to an embodiment of the present disclosure. When the load of SN1 is heavy, SN1 can decide and complete the addition of a new node SN2, and perform traffic transmission between SN2 and the UE. Wherein, MN is not involved in the adding process of the new node SN2. The steps included in the method are as shown in FIG. 17, where following steps are provided.

Step 1701, SN1 sends an SN2 addition request message (S-NODE ADDITION REQUEST) to SN2, or other messages for requesting SN addition. The SN1 considers to add an SN2, by evaluating the load status of the SN1 or according to factors such as a movement speed of UE and a frequency or coverage of the serving cell of the SN1, to alleviate the load status of the SN1 or reduce the service interruption and the signaling overheads caused by node change due to the movement of the UE. The message includes at least one of the following information:

- a bearer indication of resource scheduling information of SCG2, for indicating which node among MN, SN1 and SN2 sends resource scheduling information of cells of SCG2 of SN2. If the resource scheduling information is sent by SN2, SN2 needs to configure PDCCH in SCG2, otherwise SN2 does not need to configure PDCCH; if the resource scheduling information is sent by MN or SN1, SN2 needs to send the scheduling information to MN or SN1 during data transmission, and MN or SN1 forwards the same to the UE; and
- information of services that needs to be carried on SN2, alternatively, a container form may be used for the service information, including SN2 terminated, MN terminated, and SN1 terminated service information, respectively.

Step 1702, SN2 sends an SN addition request acknowledgment message (S-NODE ADDITION REQUEST ACKNOWLEDGE) to SN1, or other messages for acknowledging the SN addition request. The message includes at least one of the following information:

- configuration information of SN2 for services, alternatively, a container form may be used for the configuration information, including SN2 terminated, MN terminated, and SN1 terminated service configuration information, respectively; and
- SCG ID of the added SCG2 and configuration information (CG-Config) of SCG2 sent to the UE, which includes the bearer indication of the resource scheduling information of SCG2, for indicating the UE how to obtain the resource scheduling information of cells of SCG2. If it is indicated in step 1701 that SN2 sends resource scheduling information of cell of SCG2 to the UE, CG-Config may include PDCCH information.

If SN1 is configured with SRB3, then steps 1703, 1704 and 1709 may be performed.

If SN1 is not configured with SRB3, then steps 1705 to 1709 may be performed.

Step 1703, SN1 sends an RRC reconfiguration message (RRCReconfiguration) to the UE. If SN1 is configured with SRB3, SN1 directly sends an RRC reconfiguration message to the UE. The message includes at least one of the following information: SCG ID of the added SCG2 and configuration information (CG-Config) of SCG2, SCG ID of SCG1 and modified configuration information (CG-Config) of SCG1. The configuration information (CG-Config) of SCG2 includes bearer indication of resource scheduling information of SCG2, for indicating the UE how to obtain the resource scheduling information of cells of SCG2. Alternatively, if the configuration information of SCG2 includes PDCCH information, it is considered that the resource scheduling information of the cells of SCG2 is transmitted on SCG2. Alternatively, a container form may be used to place the configuration information of the SCG1 and the SCG2, in one container together or in different containers according to the SCG1 and the SCG2. Wherein, the configuration information of SCG2 may be included in the RRC reconfiguration message sent by SN2 to the UE, or be provided in other forms.

The UE completes the update of configuration according to the received configuration information of SCG1 and/or SCG2, and determines whether to monitor a PDCCH channel of SN2 according to the bearer indication of resource scheduling information of SCG2, and obtains the resource scheduling information of SCG2.

Step 1704, the UE sends an RRC reconfiguration complete message (RRCReconfigurationComplete) to SN1. After completing the new configuration, the UE sends an RRC reconfiguration complete message to SN1, which includes an SN RRC reconfiguration complete message or an SN RRC response message, sent by the UE to SN2. The RRC reconfiguration complete message is carried via SRB3.

Step 1705, SN1 sends an SN modification required message (S-NODE MODIFICATION REQUIRED) to MN. The message includes an SN RRC reconfiguration message sent by SN1 to the UE.

Step 1706, MN sends an RRC reconfiguration message (RRCReconfiguration) to the UE. MN forwards the SN RRC reconfiguration message sent by SN1 to the UE received in step 1705 to the UE through the RRC reconfiguration message. The SN RRC reconfiguration message sent by SN1 to the UE includes at least one of the following information: SCG ID of added SCG2 and configuration information (CG-Config) of SCG2, SCG ID of SCG1 and modified configuration information (CG-Config) of SCG1. Wherein, the configuration information (CG-Config) of SCG2 includes bearer indication of resource scheduling information of SCG2, for indicating the UE how to obtain the resource scheduling information of each cell of the SCG2. Alternatively, if the configuration information of SCG2 includes PDCCH information, it is considered that the resource scheduling information of the cells of SCG2 is transmitted on SCG2. Wherein, the configuration information of SCG2 may be provided in the form of a container, included in the RRC reconfiguration message sent by SN2 to the UE, or provided in other forms.

The UE completes the update of configuration according to the configuration information of SCG1 and SCG2, and determines whether to monitor the PDCCH channel of SN2 according to the bearer indication of the resource scheduling information of SCG2, and obtains the resource scheduling information of SCG2.

Step 1707, the UE sends an RRC reconfiguration complete message (RRCReconfigurationComplete) to MN. When the UE completes the update of configuration according to the received SN RRC reconfiguration message, the UE sends an RRC reconfiguration complete message to MN, which includes an SN RRC reconfiguration complete message or an SN RRC response message sent by the UE to SN1. The SN RRC reconfiguration complete message sent by the UE to the SN1 includes the SN RRC reconfiguration complete message or the SN RRC response message sent by the UE to SN2.

Step 1708, MN sends an SN modification confirm message (S-NODE MODIFICATION CONFIRM) to SN1. When MN receives the SN RRC reconfiguration complete message or the SN RRC response message provided by the UE to SN1, MN sends the SN RRC reconfiguration complete message or the SN RRC response message to SN1 through the SN modification confirm message. It includes the SN RRC reconfiguration complete message or the SN RRC response message, sent by the UE to SN2.

Step 1709, SN1 sends an SN reconfiguration complete message (S-NODE RECONFIGURATION COMPLETE) to SN2. SN1 forwards to SN2, the SN RRC reconfiguration complete message or the SN RRC response message sent by the UE to SN2, indicating that the UE has completed the configuration provided by SN2 to SCG2.

Figure 14:
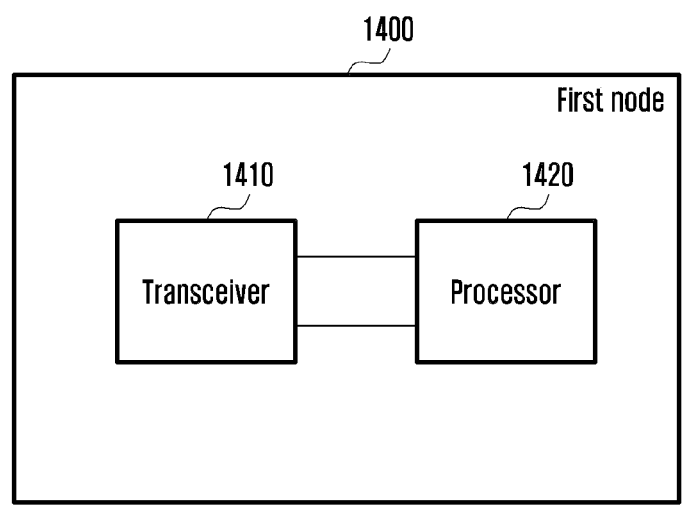
FIG. 14 illustrates the structure of a first node according to an embodiment of the present disclosure.

FIG. 14 illustrates a block diagram of the structure of a first node according to an embodiment of the present disclosure.

Referring to FIG. 14, the first node 1400 may be an MN. The first node 1400 includes a transceiver 1410 and a processor 1420. The first node is a node in dual connectivity, may be a gNB or an eNB, or an independent base station, or a base station in a CU/DU separation mode.

The transceiver 1410 may be configured to send a signal to the outside and/or receive a signal from the outside. The processor 1420 may be configured to be coupled to the transceiver to implement the method described in the present disclosure. The first node 1400 may be implemented in the form of hardware, software or a combination of hardware and software, so that it can perform any one or more steps in any method described in the present disclosure.

Figure 15:
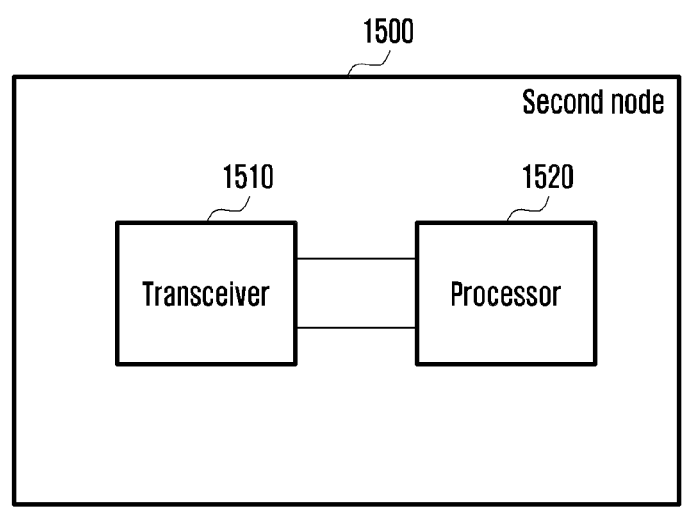
FIG. 15 illustrates the structure of a second node according to an embodiment of the present disclosure.

FIG. 15 illustrates a block diagram of the structure of a second node according to an embodiment of the present disclosure. The second node is a node in dual connectivity, may be a gNB or an eNB, or an independent base station, or a base station in a CU/DU separation mode, or may be a base station including a central unit control plane, a central unit-user plane, and a distributed unit.

Referring to FIG. 15, the second node 1500 may be a secondary node. The second node 1500 includes a transceiver 1510 and a processor 1520.

The transceiver 1510 may be configured to send a signal to the outside and/or receive a signal from the outside. The processor 1520 may be configured to be coupled to the transceiver to implement the method described in the present disclosure. The second node 1500 may be implemented in the form of hardware, software or a combination of hardware and software, so that it can perform any one or more steps in any method described in the present disclosure.

Figure 16:
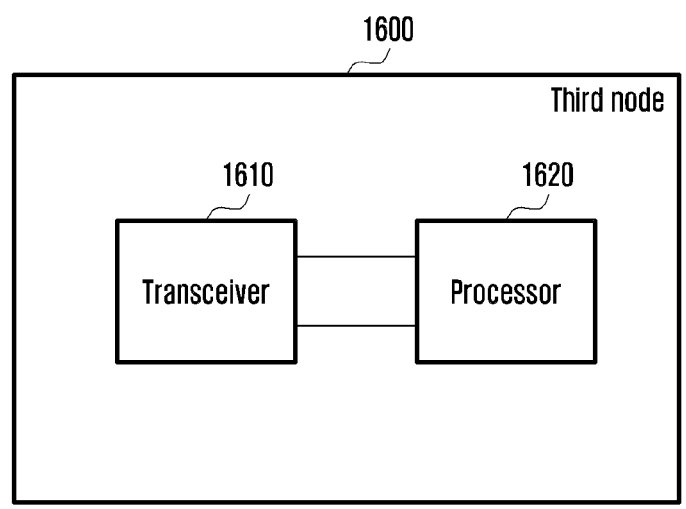
FIG. 16 illustrates the structure of a third node according to an embodiment of the present disclosure.

FIG. 16 illustrates a block diagram of the structure of a third node SN2 according to an embodiment of the present disclosure.

Referring to FIG. 16, the third node 1600 may be an added node SN2. The third node SN2 is a node in dual connectivity, may be a gNB or an eNB, or an independent base station, or a base station in a CU/DU separation mode, or may be a base station including a central unit control plane, a central unit-user plane, and a distributed unit.

The transceiver 1610 may be configured to send a signal to the outside and/or receive a signal from the outside. The processor 1620 may be configured to be coupled to the transceiver to implement the method described in the present disclosure. The third node 1600 may be implemented in the form of hardware, software or a combination of hardware and software, so that it can perform any one or more steps in any method described in the present disclosure.

It will be understood by a person skilled in the art that the various descriptive logic blocks, modules, circuits, and steps described in the present application may be implemented as hardware, software, or a combination of both. To clearly illustrate this interchangeability of hardware and software, the various descriptive components, blocks, modules, circuits, and steps are described above in general terms in terms of their functional sets. Whether such functional sets are implemented as hardware or software depends on the specific application and the design constraints imposed on the overall system. The skilled may implement the described functional set in different ways for each particular application, but such design decisions should not be construed as departing from the scope of the present application.

The individual descriptive logic blocks, modules, and circuits described in the present application may be implemented or executed with a general-purpose processor, a digital signal processor (DSP), an application-specific integrated circuit (ASIC), a field programmable gate array (FPGA), or another programmable logic device, discrete gates or transistor logic, discrete hardware components, or any combination thereof designed to perform the functions described herein. The general-purpose processor may be a microprocessor, but in alternatives, the processor may be any conventional processor, controller, microcontroller, or state machine. The processor may be implemented as a combination of computing devices, such as a combination of a DSP and a microprocessor, a plurality of microprocessors, one or more microprocessors in collaboration with a DSP core, or any other such configuration.

The steps of the method or algorithm described in the present application may be embodied directly in hardware, in a software module executed by a processor, or in a combination of the two. The software module may reside in a RAM storage, a flash memory, a ROM storage, an EPROM storage, an EEPROM storage, a register, a hard disk, a removable disk, or any other form of storage medium known in the art. An exemplary storage medium is coupled to a processor to enable the processor to read and write information from/to the storage medium. In alternatives, the storage medium may be integrated into the processor. The processor and the storage medium may reside in an ASIC, which may reside in a user terminal. In alternatives, the processor and the storage medium may reside in the user terminal as discrete components.

In one or more exemplary designs, the functions may be implemented in hardware, software, firmware, or any combination thereof. If implemented in software, the functions may be stored as one or more instructions or code on or transmitted by a computer-readable medium. The computer-readable medium includes both a computer storage medium and a communication medium, the latter including any medium that facilitates the transfer of a computer program from one location to another. The storage medium may be any available medium that can be accessed by a general-purpose or special-purpose computer.

The embodiments of the present application are merely intended to facilitate description and to aid in a comprehensive understanding of the present disclosure, and are not intended to limit the scope of the present disclosure. Accordingly, it should be understood that all modifications and alterations, or modified and altered forms, of technical concepts derived from the present disclosure, other than the embodiments disclosed herein, fall within the scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first node in a wireless communication system including a user equipment (UE) connected to the first node and a second node, the method comprising:

receiving, from the second node, a first message for requiring an addition of a third node;

transmitting, to the second node, a second message for indicating that the second node is an execution node to perform the addition of the third node; and receiving, from the second node, a third message associated with a completion of the addition of the third node, wherein the first node is a master node (MN), and wherein the second message comprises an indication of the addition of the third node.

2. The method of claim 1, further comprising:

based on the first message, determining that the second node is the execution node to perform the addition of the third nodes.

3. The method of claim 1, wherein the first message comprises at least one of an indication of requiring the addition of the third node, information of a candidate node list or a candidate cell list, or information of establishing a signaling radio bearer 3 (SRB3) by the second node.

4. The method of claim 1, wherein the second message comprises at least one of the indication of the addition of the third node, an indication of the execution node, information of a candidate node list or a candidate cell list, an involvement indication of the first node, or a bearer indication of resource scheduling information for the third node.

5. The method of claim 1, wherein the third message comprises at least one of an indication of the completion of the addition of the third node, identity information of the third node, identity information of a third cell group, configuration information of the third node, or configuration information of the third cell group.

6. A method performed by a second node in a wireless communication system including a user equipment (UE) connected to a first node and the second node, the method comprising:

transmitting, to the first node, a first message for requiring an addition of a third node;

receiving, from the first node, a second message for indicating that the second node is an execution node to perform the addition of the third node; and transmitting, to the second node, a third message associated with a completion of the addition of the third node, wherein the first node is a master node (MN), and wherein the second message comprises an indication of the addition of the third node.

7. The method of claim 6, wherein the second node is determined to be the execution node to perform the addition of the third node based on the first message.

8. The method of claim 6, wherein the first message comprises at least one of an indication of requiring the addition of the third node, information of a candidate node list or a candidate cell list, or information of establishing a signaling radio bearer 3 (SRB3) by the second node.

9. The method of claim 6, wherein the second message comprises at least one of the indication of the addition of the third node, an indication of the execution node, information of a candidate node list or a candidate cell list, an involvement indication of the second node, or a bearer indication of resource scheduling information for the third node.

10. The method of claim 6, wherein the third message comprises at least one of an indication of the completion of the addition of the third node, identity information of the third node, identity information of a third cell group, configuration information of the third node, or configuration information of the third cell group.

11. A first node in a wireless communication system including a user equipment (UE) connected to the first node and a second node, the first node comprising:

a transceiver; and at least one processor coupled with the transceiver and configured to:

receive, from the second node, a first message for requiring an addition of a third node, transmit, to the second node, a second message for indicating that the second node is an execution node to perform the addition of the third node, and receive, from the second node, a third message associated with a completion of the addition of the third node, wherein the first node is a master node (MN), and wherein the second message comprises an indication of the addition of the third node.

12. The first node of claim 11, wherein the at least one processor is further configured to:

based on the first message, determine that the second node is the execution node to perform the addition of the third node.

13. The first node of claim 11, wherein the first message comprises at least one of an indication of requiring the addition of the third node, information of a candidate node list or a candidate cell list, or information of establishing a signaling radio bearer 3 (SRB3) by the second node.

14. The first node of claim 11, wherein the second message comprises at least one of the indication of the addition of the third node, an indication of the execution node, information of a candidate node list or a candidate cell list, an involvement indication of the first node, or a bearer indication of resource scheduling information for the third node.

15. The first node of claim 11, wherein the third message comprises at least one of an indication of the completion of the addition of the third node, identity information of the third node, identity information of a third cell group, configuration information of the third node, or configuration information of the third cell group.

16. A second node in a wireless communication system including a user equipment (UE) connected to a first node and the second node, the second node comprising:

a transceiver; and at least one processor coupled with the transceiver and configured to:

transmit, to the first node, a first message for requiring an addition of a third node, receive, from the first node, a second message for indicating that the second node is an execution node to perform the addition of the third node, and transmit, to the second node, a third message associated with a completion of the addition of the third node, wherein the first node is a master node (MN), and wherein the second message comprises an indication of the addition of the third node.

17. The second node of claim 16, wherein the second node is determined to be the execution node to perform the addition of the third node based on the first message.

18. The second node of claim 16, wherein the first message comprises at least one of an indication of requiring the addition of the third node, information of a candidate node list or a candidate cell list, or information of establishing a signaling radio bearer 3 (SRB3) by the second node.

19. The second node of claim 16, wherein the second message comprises at least one of the indication of the addition of the third node, an indication of the execution node, information of a candidate node list or a candidate cell list, an involvement indication of the second node, or a bearer indication of resource scheduling information for the third node.

20. The second node of claim 16, wherein the third message comprises at least one of an indication of the completion of the addition of the third node, identity information of the third node, identity information of a third cell group, configuration information of the third node, or configuration information of the third cell group.

* * * * *